United States Patent
Yasui

(10) Patent No.: US 9,450,528 B2
(45) Date of Patent: Sep. 20, 2016

(54) SENSORLESS CONTROL APPARATUS FOR SYNCHRONOUS MOTOR AND INVERTER APPARATUS

(75) Inventor: Kazuya Yasui, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 638 days.

(21) Appl. No.: 13/596,550

(22) Filed: Aug. 28, 2012

(65) Prior Publication Data

US 2013/0049656 A1 Feb. 28, 2013

(30) Foreign Application Priority Data

Aug. 29, 2011 (JP) .................. 2011-186126
Jun. 4, 2012 (JP) .................. 2012-127546

(51) Int. Cl.
H02P 21/14 (2016.01)
H02P 6/18 (2016.01)
H02P 21/00 (2016.01)

(52) U.S. Cl.
CPC .................. *H02P 21/00* (2013.01)

(58) Field of Classification Search
USPC .................... 318/812, 599, 400.32
See application file for complete search history.

(56) References Cited

U.S. PATENT DOCUMENTS 4,617,636 A * 10/1986 Johns .................. H02H 3/40
324/556
2002/0149335 A1* 10/2002 Imai .................. H02P 6/185
318/494
2004/0070360 A1* 4/2004 E. Schulz .................. B60L 11/18
318/700
2004/0113582 A1 6/2004 Ide (Continued)

FOREIGN PATENT DOCUMENTS

CN 1777017 A 5/2006
CN 101542891 A 9/2009

(Continued)

OTHER PUBLICATIONS

Chinese Office Action dated Aug. 5, 2014, issued in counterpart application No. 2012103843132 and an English translation thereof.

(Continued)

*Primary Examiner* — Paul Ip
*Assistant Examiner* — Said Bouziane
(74) *Attorney, Agent, or Firm* — Holtz, Holtz & Volek PC

(57) ABSTRACT

According to one embodiment, a sensorless control apparatus for a synchronous motor, includes a PWM processing unit which pulse-width-modulates a three-phase voltage command, and thereby generates a gate command for an inverter, a high-frequency voltage calculator which obtains a high-frequency voltage component included in an output of the PWM processing unit or an equivalent output value, a high-frequency current calculator which obtains a high-frequency current component included in a current response value from a synchronous motor driven by the inverter, and an estimated angle calculator which calculates an estimated phase angle indicative of an estimated value of an angle of rotation of the synchronous motor, based on a plurality of pairs each including the high-frequency voltage component and the high-frequency current component which respectively include cosine components or sine components at an equal frequency, the pairs obtained for at least two different frequencies.

12 Claims, 15 Drawing Sheets

(56) References Cited

U.S. PATENT DOCUMENTS

| | | | |
|---|---|---|---|
| 2004/0120699 A1* | 6/2004 | Lin | H05B 33/0818 388/804 |
| 2004/0232862 A1* | 11/2004 | Wogari et al. | 318/254 |
| 2006/0097686 A1 | 5/2006 | Yasui et al. | |
| 2007/0069682 A1* | 3/2007 | Ide | H02P 21/141 318/719 |
| 2008/0111516 A1* | 5/2008 | Inokuma | H02P 21/14 318/799 |
| 2009/0021195 A1* | 1/2009 | Tomigashi | 318/400.02 |
| 2009/0315495 A1* | 12/2009 | Yasui | 318/400.34 |
| 2010/0207555 A1* | 8/2010 | Ide | H02P 21/0053 318/400.02 |
| 2011/0050140 A1* | 3/2011 | Sakai | H02P 9/30 318/400.36 |
| 2011/0304290 A1* | 12/2011 | Ito | H02P 6/185 318/400.32 |

FOREIGN PATENT DOCUMENTS

| | | |
|---|---|---|
| JP | 3168967 B2 | 3/2001 |
| JP | 2002291283 A | 10/2002 |
| JP | 2003153582 A | 5/2003 |
| JP | 2004096856 A | 3/2004 |
| JP | 2006-185552 A | 7/2006 |
| JP | 2007-056183 A | 3/2007 |
| JP | 2008-017608 A | 1/2008 |
| JP | 2008-220096 A | 9/2008 |
| JP | 2009153347 A | 7/2009 |
| JP | 2010213437 A | 9/2010 |

OTHER PUBLICATIONS

Japanese Office Action (and English translation thereof) dated Dec. 22, 2015, issued in counterpart Japanese Application No. 2012-181791.

\* cited by examiner

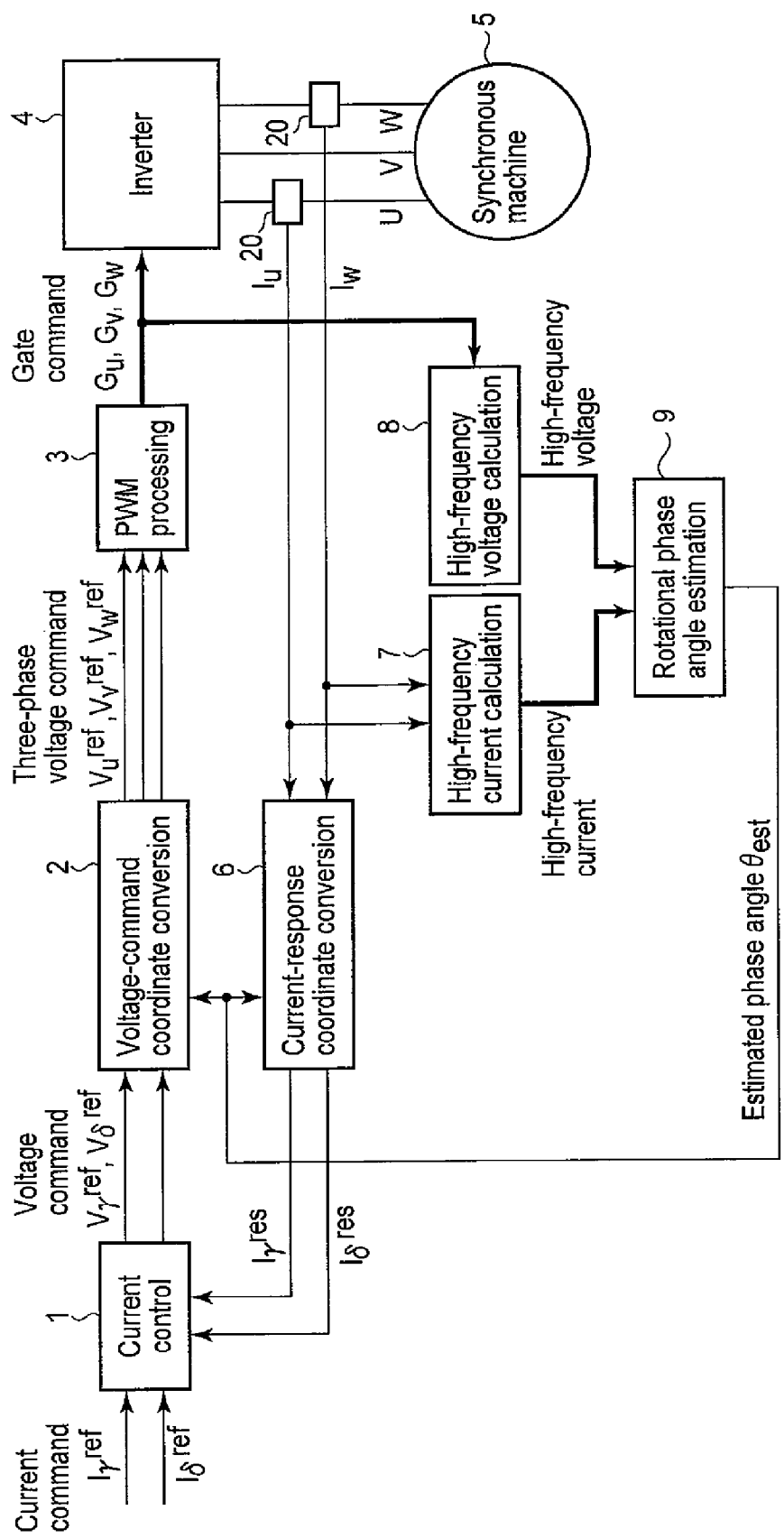
F I G. 1

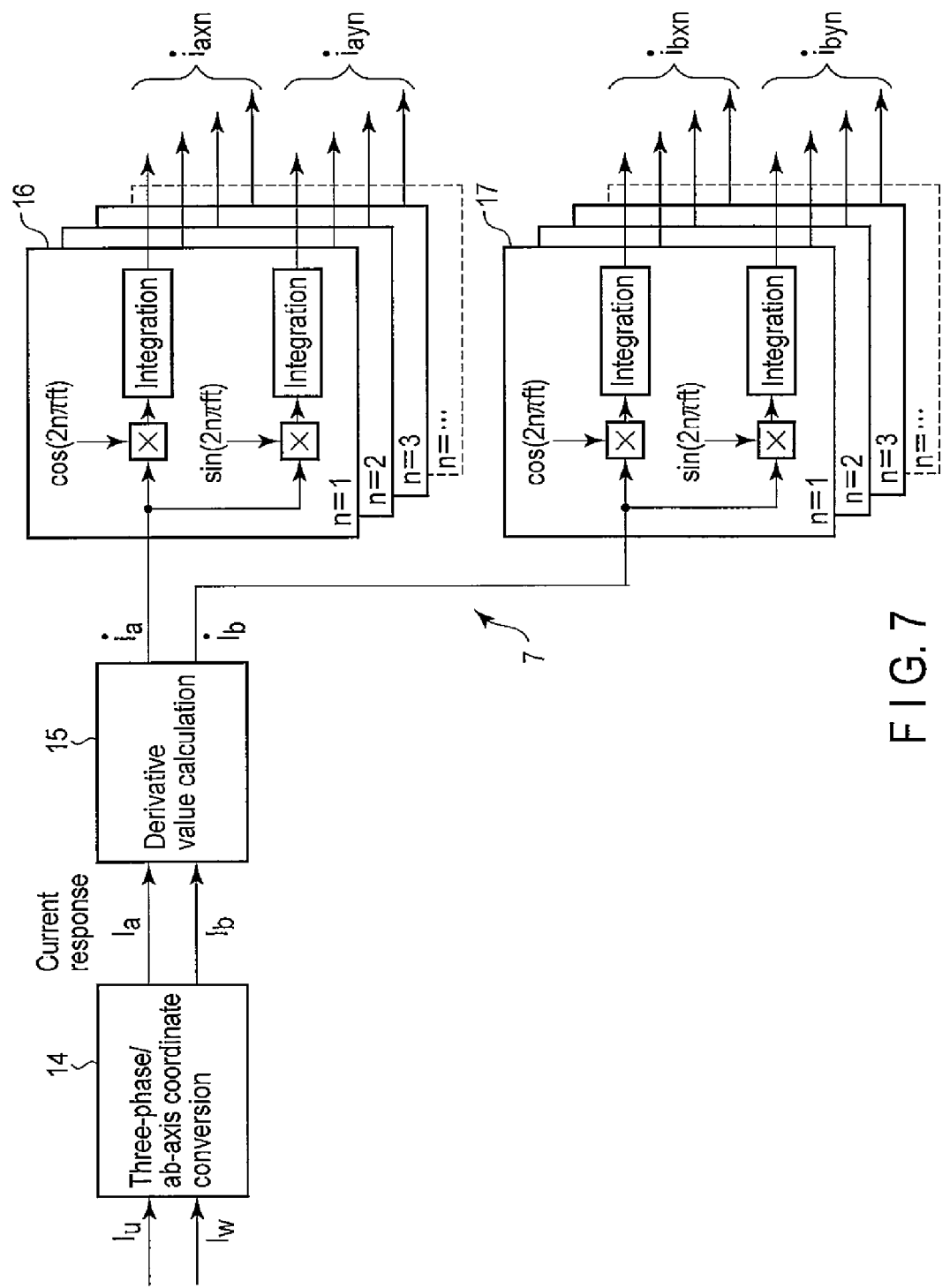
F I G. 7

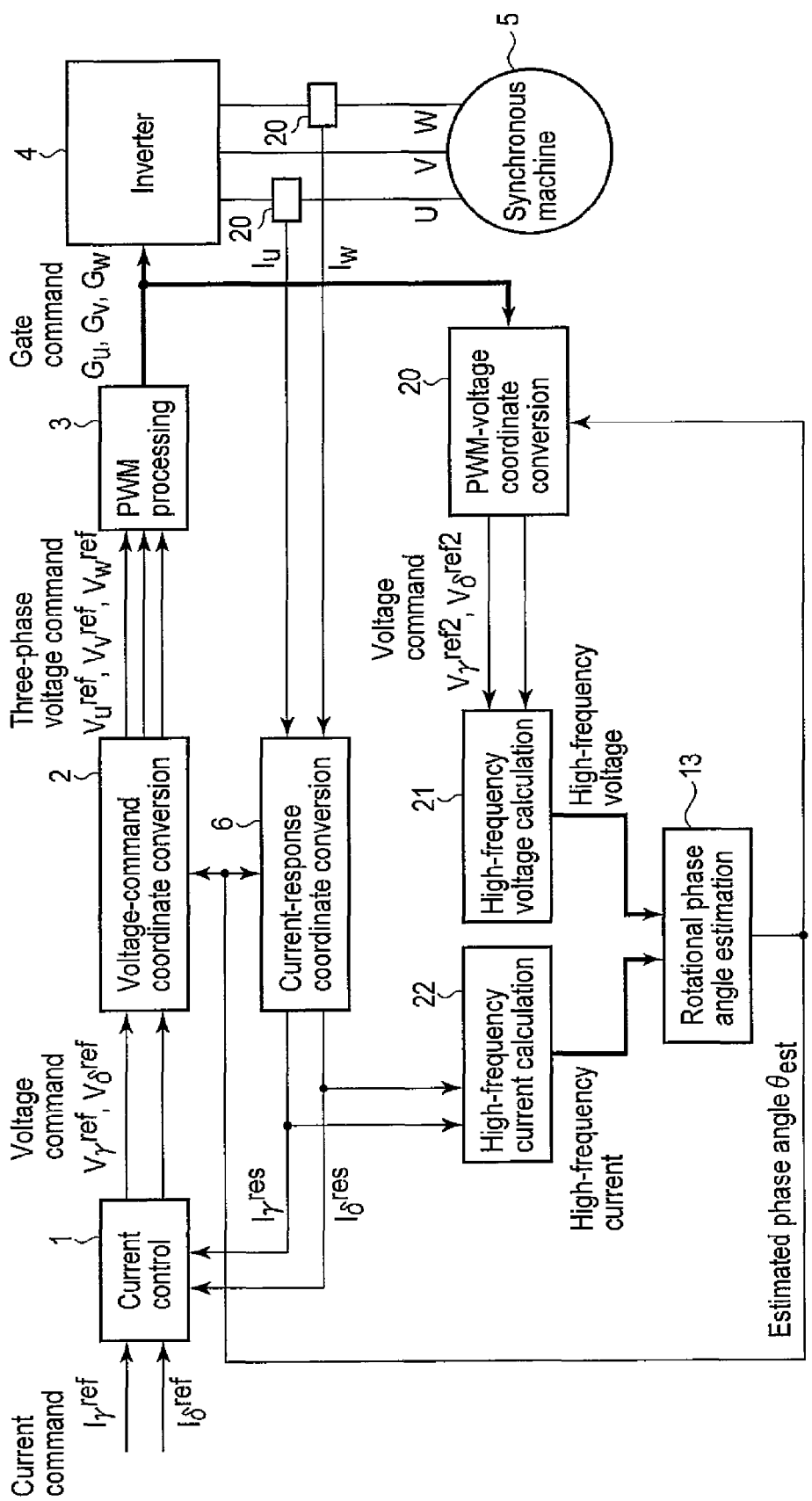
F I G. 9

SENSORLESS CONTROL APPARATUS FOR SYNCHRONOUS MOTOR AND INVERTER APPARATUS

CROSS-REFERENCE TO RELATED APPLICATIONS

This application is based upon and claims the benefit of priority from Japanese Patent Applications No. 2011-186126, filed Aug. 29, 2011; and No. 2012-127546, filed Jun. 4, 2012, the entire contents of all of which are incorporated herein by reference.

FIELD

Embodiments described herein relate generally to a sensorless control apparatus which estimates an angle of rotation of a permanent magnet rotator by calculation, and controls a pulse-width modulation (PWM) inverter to drive a synchronous electric motor.

BACKGROUND

A control apparatus for an alternating-current synchronous motor generally requires a detector which detects an angle of rotation of a rotator to perform drive control of a synchronous electric motor. However, a drive apparatus using a detector has problems as described as examples below.

Firstly, presence of the detector causes increase in volume of an entire drive system. This increase hinders enhancement of output from a synchronous machine in a limited installation space. Secondly, maintenance work for the detector itself is required. Maintenance work efficiency therefore deteriorates. Thirdly, noise is superimposed on a signal line from the detector. Therefore, detected values are disturbed and control performance deteriorates. Fourthly, most of detectors require power supplies for driving themselves, and a power supply of a system different from that for driving the synchronous machine needs to be provided. This is a factor which increases burdens on a power-supply installation space, a power supply line, and costs.

From reasons as described, a control method has been developed in which an angle of rotation is estimated by calculation based on electric information such as a current or a voltage to drive the synchronous machine, and drive control is performed by using the estimated angle of rotation without using a detector. This control method is generally referred to as "sensorless control".

As prior art which proposes a method especially effective for a standstill state and a low-speed state in a control apparatus for a synchronous machine which comprises such a sensorless control unit, there is a system which drives a synchronous machine by a PWM inverter. In the system, a high-frequency voltage command at a sufficiently high frequency compared with an operating frequency of the synchronous machine is superimposed on a control command of a control apparatus which controls an inverter. Such an apparatus obtains estimated error information for an angle of rotation by detecting a component corresponding to a superimposed high-frequency voltage command, from a high-frequency current response generated because of the high-frequency voltage command. By using the information, the angle of rotation is estimated.

The control apparatus as described above for a synchronous machine can control the synchronous machine without using a sensor and is effective in that maintenance property improves at low costs. However, as described above, in the method of detecting a component corresponding to a high-frequency voltage command of a high-frequency current response, a desired high-frequency current needs to be flowed, and has a problem of extreme increase in loss and noise in comparison with a system using a sensor. In addition, to stably estimate a rotational phase angle, the amplitude and frequency of a high-frequency command and a high-frequency superimposition method need to be finely adjusted. In order to perform stable operation by combining a motor and a control apparatus in actual, complex time-consuming adjustment is required.

Further, in a method which has been proposed to solve the problems of the prior art, a high-frequency component of a current generated by a voltage output from a PWM inverter is calculated, and an angle of rotation is estimated by using a spatial distribution of inductances.

In the proposed method as above, when a rotational phase angle is estimated by using the spatial distribution of inductances, estimation is performed with use of a high-frequency current value which is generated by switching in actual. Therefore, a high-frequency current caused by PWM switching needs to be observed. However, the current needs to be sampled at timings close to switching in order to observe a high-frequency current caused by switching. Further, in the foregoing method, there is difficulty in observing the current with high accuracy under influence of spike noise caused by switching, and particular consideration is required for current sampling management and noise solution.

The embodiments described herein are to solve the problems described above, and provide a sensorless control apparatus which suppresses loss and noise caused by a high-frequency current to detect rotation of a rotator, without requiring a particular care for observation of a current.

BRIEF DESCRIPTION OF THE DRAWINGS

FIG. 1 is a block diagram showing a configuration of a sensorless control apparatus according to the first embodiment;

FIG. 7 is a block diagram showing an example configuration of a high-frequency voltage calculator 7;

FIG. 9 is a block diagram showing a configuration of a sensorless control apparatus according to the second embodiment;

DETAILED DESCRIPTION

Figure 2:
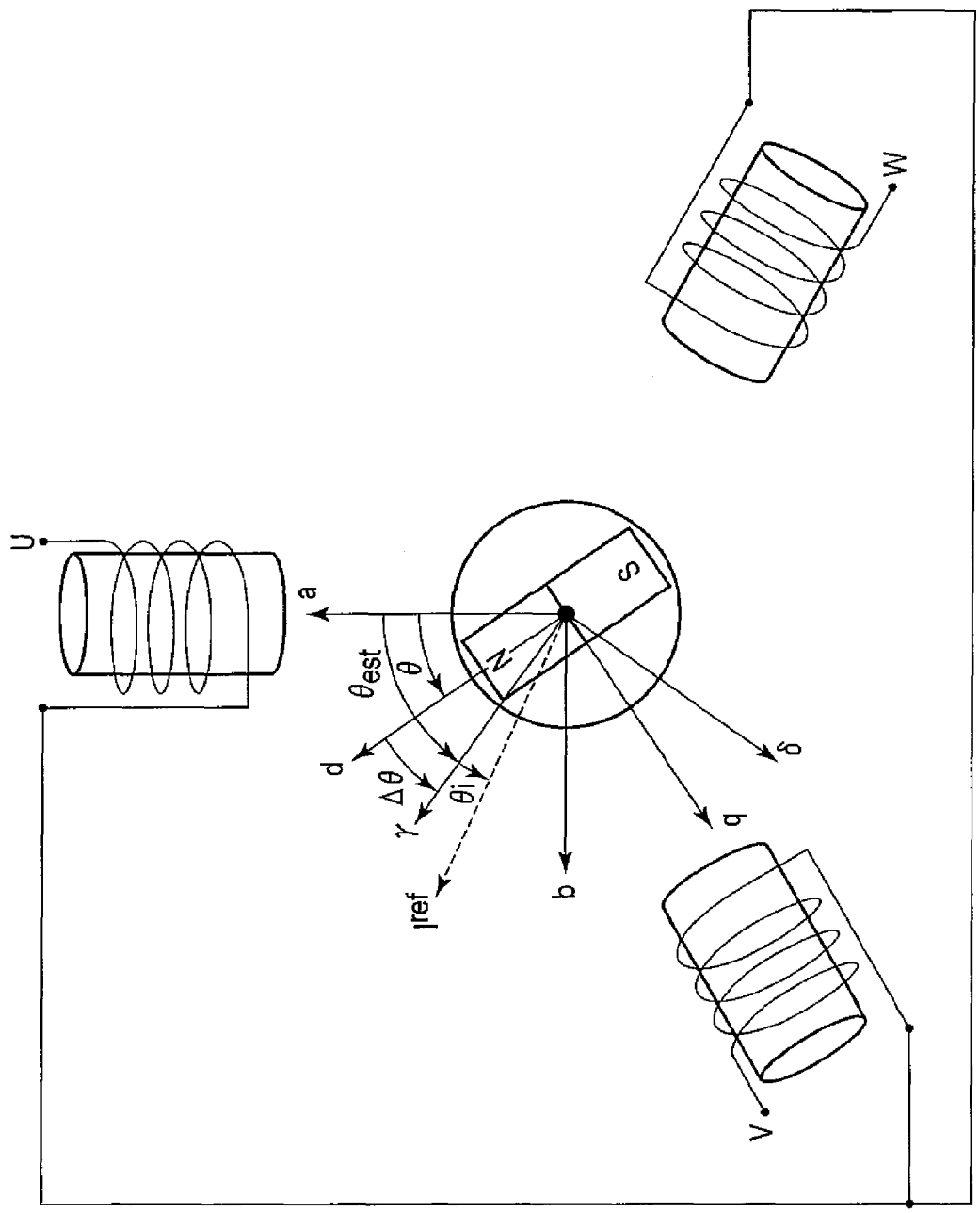
FIG. 2 shows definitions of coordinate systems relating to vector control.

In general, according to one embodiment, there is provided a sensorless control apparatus for a synchronous motor, comprising: a PWM processing unit which pulse-width-modulates a three-phase voltage command, based on comparison between the three-phase voltage command and a PWM carrier, and thereby generates a gate command for an inverter; a high-frequency voltage calculator which obtains a high-frequency voltage component by calculating at least one of sine components and cosine components of a plurality of frequencies not lower than a carrier frequency of the PWM carrier, the components included in an output of the PWM processing unit or an equivalent output value; a high-frequency current calculator which obtains a high-frequency current component by calculating at least one of sine components and cosine components having a plurality of frequencies not lower than the carrier frequency, the components being included in a current response value from a synchronous motor driven by the inverter; and an estimated angle calculator which calculates an estimated phase angle indicative of an estimated value of an angle of rotation of the synchronous motor, based on a plurality of pairs each including the high-frequency voltage component and the high-frequency current component which respectively include cosine components or sine components at an equal frequency, the pairs obtained for at least two different frequencies.

Hereinafter, a sensorless control apparatus according to an embodiment will be described with reference to drawings.

First Embodiment

FIG. 1 is a block diagram showing a configuration of the first embodiment of the sensorless control apparatus.

An inverter 4 comprises a known three-phase switching circuit. The inverter 4 converts a direct current voltage into a three-phase alternating-current voltage which has a desired size and a desired frequency by turning on/off each switching element upon receipt of a gate command, and drives a synchronous motor 5.

A PWM processing unit 3 generates an on/off gate command to each switching element of in the inverter 4 by comparing a three-phase voltage command and an internally generated triangle carrier, as in a common triangle-wave comparison PWM method. Other available PWM processing methods are hysteresis PWM and spatial vector PWM. In the hysteresis PWM, a three-phase current command is used as an input. Depending on whether the three-phase-current response value falls within an error range (hysteresis width) specified for the current command or not, an on/off gate command for each switching element is generated. The spatial vector PWM is input with a three-phase voltage command, and generates an on/off gate command to each switching element by calculating a voltage vector and an output time thereof to be output from the inverter, depending on spatial position where the voltage command is considered as a vector.

A current controller 1 performs calculation to control rotation of an electric motor 5. In FIG. 1, the current controller 1 is input with current commands $I\gamma^{ref}$ and $I\delta^{ref}$ and current responses $I\gamma^{res}$ and $I\delta^{res}$, and outputs voltage commands $V\gamma^{ref}$ and $V\delta^{ref}$. However, a different method may alternatively be adopted. For example, a rotational speed command can be input. As a method which controls torque of the synchronous machine 5 and a response such as rotational speed at high speed, a control method called vector control is generally employed at present. The present embodiment also employs this control method.

Next, the vector control will be described with reference to a permanent-magnet synchronous machine using a permanent magnet for a rotator.

At first, as shown in FIG. 2, on a coordinate system which rotates in synchronism with rotation of the permanent-magnet synchronous motor, a direction of magnetic flux of the permanent magnet is defined as an axis d while an axis perpendicular to axis d is defined as axis q. Further, a U-phase winding direction is defined as an axis a, and a direction perpendicular to the U-phase winding direction is defined as an axis b. An angle to a d-axis direction from the a-axis direction as a reference is defined as a rotational phase angle θ of the synchronous motor. Based on definitions as described above, a relationship between a voltage and a current of a permanent-magnet synchronous motor is expressed by an Expression 1.

$$\begin{bmatrix} V_d \\ V_q \end{bmatrix} = \begin{bmatrix} R + pL_d & -\omega L_q \\ \omega L_d & R + pL_q \end{bmatrix} \begin{bmatrix} I_d \\ I_q \end{bmatrix} + \begin{bmatrix} 0 \\ \omega \Phi \end{bmatrix} \quad \text{Expression 1}$$

where $V_d$, $V_q$: d-axis voltage, q-axis voltage, $I_d$, $I_q$: d-axis current, q-axis current, R: dq-axis direction resistance of one-phase of electric rotor winding, $L_d$: d-axis inductance, $L_q$: q-axis inductance, Φ: permanent-magnet magnetic flux, ω: rotational speed, p: derivative operator.

The present control apparatus does not comprise an angle-of-rotation sensor for an electric rotor (rotator), and therefore cannot detect the angle of rotation θ directly. Accordingly, a phase angle estimated by the control apparatus is used instead. Accordingly, as shown in FIG. 2, the estimated phase angle is defined as $\theta_{est}$, and a corresponding coordinate system is defined as axes γ and δ. When an estimated error Δθ occurs, an axes γ and δ are positioned, rotated by Δθ from the axes d and q.

In FIG. 1, a current command is supplied from an upper control system. For example, based on a torque command, a γ-axis current command $I_\gamma^{ref}$ and a δ-axis current command $I_\delta^{ref}$ are expressed by Expression 2 below.

$$I_\gamma^{ref} = Trq^{ref} \cdot k \cdot \cos(\theta_i)$$

$$I_\delta^{ref} = Trq^{ref} \cdot k \cdot \sin(\theta_i) \quad \text{Expression 2}$$

where $Trq^{ref}$: torque command, k: constant, and $\theta_i$: current phase angle with reference to axis γ on the γ-δ coordinate system (FIG. 2).

$\theta_i$ may be a preset constant value or may be varied in accordance with torque. In general, $\theta_i$ is mostly stored in a table or in a function in order that maximum torque can be obtained at the smallest current amplitude.

Current commands $I_\gamma^{ref}$ and $I_\delta^{ref}$ can be provided by preparing a lookup table which can be configured by using a ROM with a torque command as a parameter and by referring to this table.

The current controller 1 is input with current commands $I_\gamma^{ref}$ and $I_\delta^{ref}$ obtained as described above and a γ-axis response values $I_\gamma^{res}$ and a δ-axis response value $I_\delta^{res}$ of a current flowing through the synchronous motor, and calculates a γ-axis voltage command $V_\gamma^{ref}$ and a δ-axis voltage command $V_\delta^{ref}$ by proportional-plus-integral control as follows.

$$V_\gamma^{ref} = \left(K_p + K_i \cdot \frac{1}{s}\right) \cdot (I_\gamma^{ref} - I_\gamma^{res}) \qquad \text{Expression 3}$$

$$V_\delta^{ref} = \left(K_p + K_i \cdot \frac{1}{s}\right) \cdot (I_\delta^{ref} - I_\delta^{res})$$

where $K_p$: proportional gain, $K_i$: integral gain, and s: Laplace operator.

Next, a voltage-command coordinate converter 2 performs coordinate conversion on the γ-axis voltage command $V_\gamma^{ref}$ and δ-axis voltage command $V_\delta^{ref}$ by calculation as follows, based on the estimated rotational phase angle (estimated phase angle) $\theta_{est}$ to obtain three-phase voltage commands $V_u^{ref}$, $V_v^{ref}$, and $V_w^{ref}$.

$$V_u^{ref} = \sqrt{\frac{2}{3}}\left\{V_\gamma^{ref}\cos(\theta_{est}) - V_\delta^{ref}\sin(\theta_{est})\right\} \qquad \text{Expression 4}$$

$$V_v^{ref} = \sqrt{\frac{2}{3}}\left\{V_\gamma^{ref}\cos\left(\theta_{est} - \frac{2}{3}\pi\right) - V_\delta^{ref}\sin\left(\theta_{est} - \frac{2}{3}\pi\right)\right\}$$

$$V_w^{ref} = \sqrt{\frac{2}{3}}\left\{V_\gamma^{ref}\cos\left(\theta_{est} + \frac{2}{3}\pi\right) - V_\delta^{ref}\sin\left(\theta_{est} + \frac{2}{3}\pi\right)\right\}$$

The three-phase voltage commands obtained by the foregoing Expression 4 are input to the PWM processing unit 3.

The current-response coordinate converter 6 obtains a γ-axis current response value $I\gamma^{res}$ and a δ-axis current response value $I_\delta^{res}$, by performing coordinate conversion on current values $I_U^{res}$, $I_V^{res}$, and $I_W^{res}$ detected by the current sensor of the synchronous machine 5, by calculation as expressed by Expression 5 below, based on the estimated phase angle $\theta_{est}$ output from the rotational phase angle estimation unit 9.

$$I_\gamma^{res} = \sqrt{\frac{2}{3}} \qquad \text{Expression 5}$$

$$\left\{I_u^{res}\cos(\theta_{est}) + I_v^{res}\cos\left(\theta_{est} - \frac{2}{3}\pi\right) + I_w^{res}\cos\left(\theta_{est} + \frac{2}{3}\pi\right)\right\}$$

$$I_\delta^{res} = -\sqrt{\frac{2}{3}}$$

$$\left\{I_u^{res}\sin(\theta_{est}) + I_v^{res}\sin\left(\theta_{est} - \frac{2}{3}\pi\right) + I_w^{res}\sin\left(\theta_{est} + \frac{2}{3}\pi\right)\right\}$$

By utilizing a sum of the three-phase currents flowing through the permanent-magnet synchronous motor 5 being zero, the γ-axis current response value $I\gamma^{res}$ and δ-axis current response value $I_\delta^{res}$ can be obtained from current values $I_U^{res}$ and $I_W^{res}$ of two phases among the three-phase currents as expressed by a next expression. In this case, the current detectors 20 need only to be provided for two phases, and the apparatus can be simplified more than when three-phase currents are detected.

$$I_\gamma^{res} = \sqrt{2}\left\{I_u^{res}\sin\left(\theta_{est} + \frac{2}{3}\pi\right) - I_w^{res}\sin(\theta_{est})\right\} \qquad \text{Expression 6}$$

$$I_\delta^{res} = \sqrt{2}\left\{I_u^{res}\cos\left(\theta_{est} + \frac{2}{3}\pi\right) - I_w^{res}\cos(\theta_{est})\right\}$$

The current response values $I_U^{res}$, $I_V^{res}$, and $I_V^{res}$ are generally output as analogue voltage values by a hole CT and a shunt resistance as current detection means, are converted into digital values by an analogue/digital converter, and are used for calculation by the control apparatus.

Next, an estimation principle about an angle of rotation according to the present application will be described.

Figure 3:
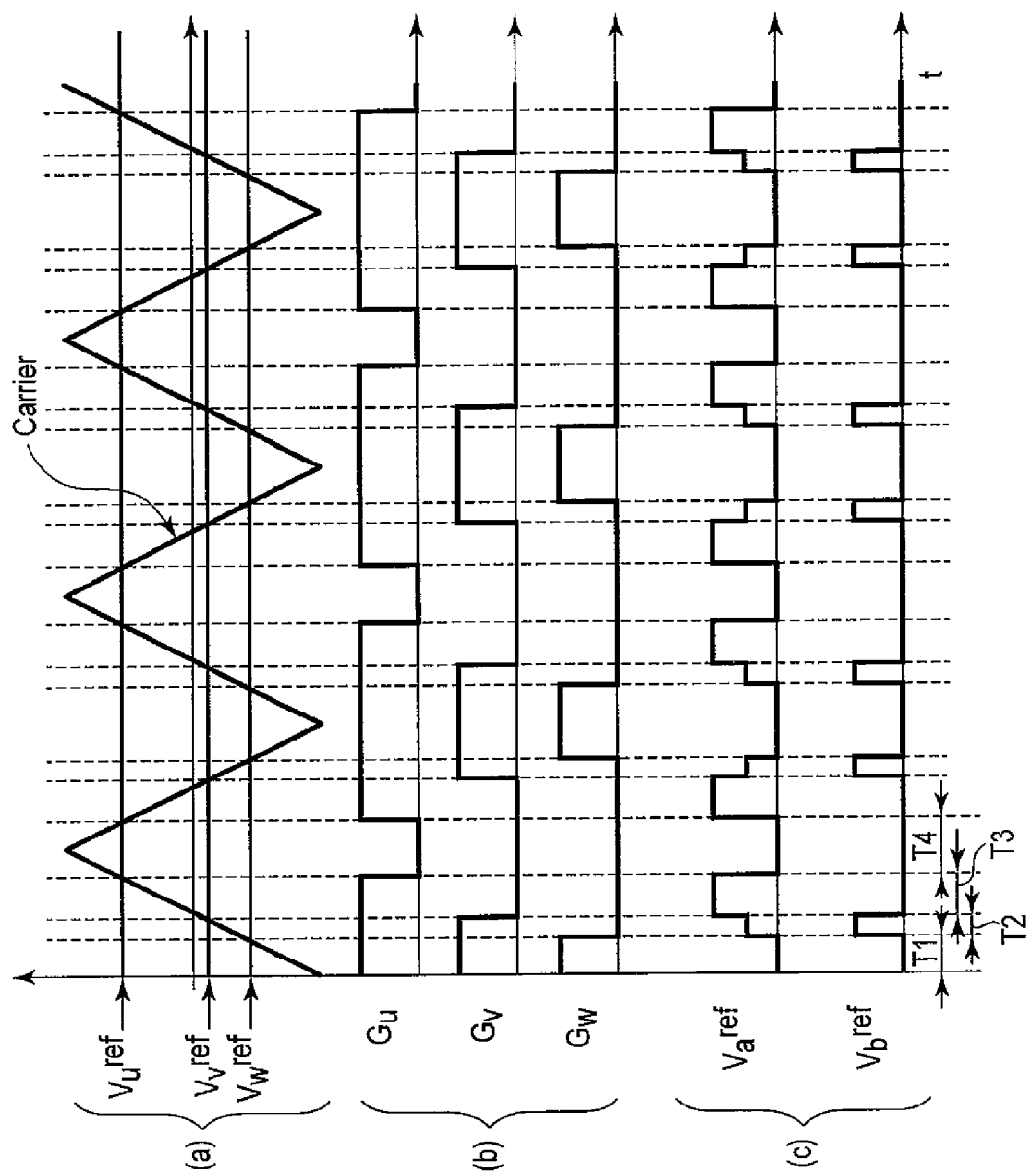
FIG. 3 shows gate commands and voltage commands generated by PWM processing.

FIG. 3 shows a gate command (b) generated by a PWM processing (a), and an ab-axis voltage command (c) for a fixed coil. The PWM processing unit 3 converts the three-phase voltage commands calculated as expressed by the Expression 4 into the gate commands to the inverter 4. As shown in (a) of FIG. 3, voltage commands $V_u^{ref}$, $V_v^{ref}$, and $V_w^{ref}$ are compared with a triangle wave carrier by the PWM processing unit 3, and gate commands $G_u$, $G_v$, and $G_w$ are thereby generated as comparative results.

(b) of FIG. 3 graphically shows gate commands for a switching element of an upper arm (a switching circuit connected to a positive direct-current power supply) of the inverter 4. Gate commands for a switching element of an upper arm (a switching circuit connected to a positive direct-current power supply) of the inverter 4 are logical inversion of the gate commands for the upper arm. Normally, the upper- and lower-arm gate commands are provided with upper- and lower-arm-shortcircuit prevention periods (dead time) to prevent malfunctions of elements. When the upper- and lower-arm gate commands switch between each other, both gate commands are turned off for a predetermined period. In the present embodiment, the dead time is considered small enough to be negligible and is therefore omitted.

When the gate command shown in (b) of FIG. 3 is converted into a value on a static coordinate system (axes a and b), the value is as shown in (c) of FIG. 3. That is, (c) of FIG. 3 shows voltage commands $Va^{ref}$ and $Vb^{ref}$ obtained by converting gate commands into values on the axes a and b on the static coordinate system.

Figure 4:
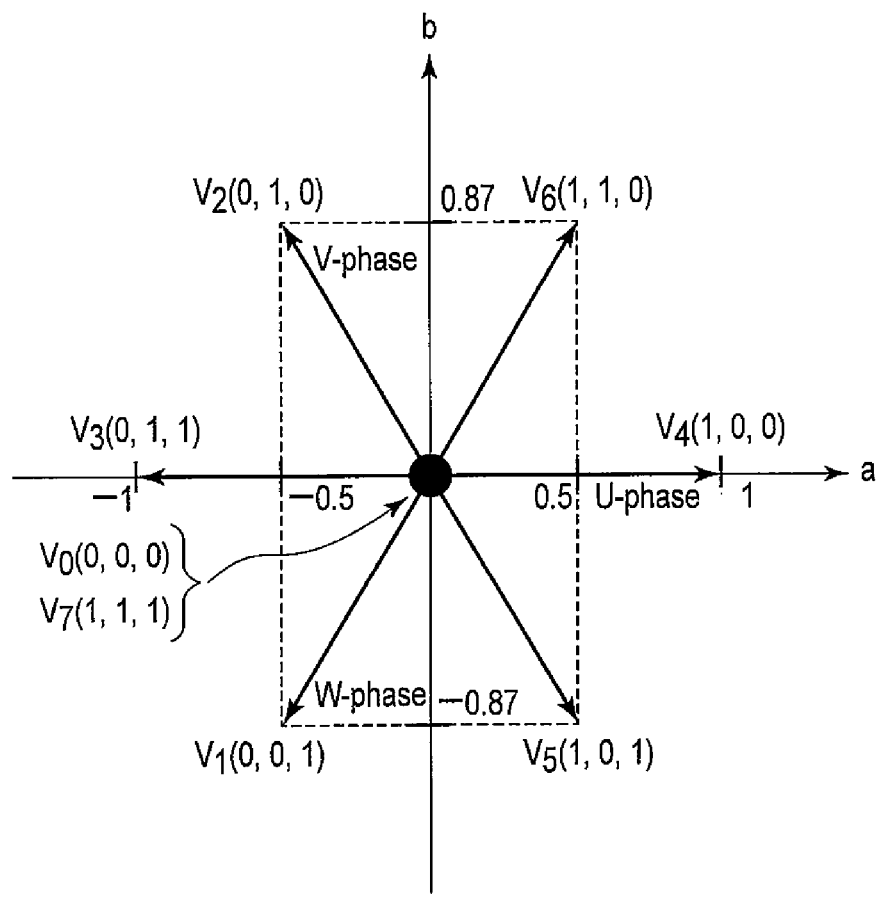
FIG. 4 shows voltage vectors corresponding to gate commands on the a-b coordinate system.

FIG. 4 shows voltage vectors corresponding to gate commands on the ab-axis coordinate system. In order to convert gate commands into ab-axis voltage commands, voltage vectors corresponding to the gate commands may be converted into values viewed from the axes a and b, as shown FIG. 4. Though FIG. 4 shows a case of normalizing lengths (values) of voltage vectors V1 to V6 to 1, these values may be actual voltage values corresponding to inverter direct-current voltages. In FIG. 4, bracketed numerals 0 and 1 appended to each of voltage vectors ($V_0$ to $V_7$) express gate commands and are arranged in the order of Gu, Gv, and Gw ((b) of FIG. 3). Where these numerals are regarded as binary numerals of sequential bits and converted into decimal numbers, vector counts 0 to 7 are obtained. However, correspondence between the vector counts and the gate commands is not always set as exactly described above insofar as correspondence between the gate commands and the ab-axis voltage values needs only to be satisfied.

That is, voltage vector $V_1$ corresponds to (001) where expressed as a gate command concerning u, v, and w. Similarly, V2 to V7 and V0 are (010), (011), (100), (101), (110), (111), and (000). Among the numerals, $V_0$ and $V_7$ have a uvw correlative voltage of zero and are therefore referred to as zero-voltage vectors. On the other side, voltage vectors $V_1$ to $V_6$ are referred to as non-zero-voltage vectors.

For example, in FIG. 3, voltage vectors V7, V6, V4, and V0 are output respectively during periods T1, T2, T3, T4, .... Voltage vector V7 (=1, 1, 1) during a period T1 is a zero vector in FIG. 4. Therefore, in (c) of FIG. 3, $Va^{ref}$ is zero and $Vb^{bref}$ is also zero. Voltage vector V6 (=1, 1, 0) during a period T2 has an angle of 60° to axis a in FIG. 4. Therefore, $Va^{ref}$ is 1/2 and $Vb^{ref}$ is $\sqrt{3}/2$ during the period T2 in (c) of FIG. 3. Voltage vector V4 (=1, 0, 0) during a period T3 has an angle of 60° to axis a in FIG. 4. Therefore, in (c) of FIG. 3, $Va^{ref}$ is 1 and $Vb^{bref}$ is xero in FIG. 3. Voltage vector V0 (=0, 0, 0) during a period T4 is a zero vector in FIG. 4. Therefore, in (c) of FIG. 3, $Va^{ref}$ is zero and $Vb^{bref}$ is also zero. Hereinafter, uvw gate commands can be converted into ab-axis voltage commands $Va^{ref}$ and $Vb^{ref}$ in the same manner as described above.

The coordinate conversion as described above can be alternatively achieved by using, for example, a lookup table (described later) which is input with $G_u$, $G_v$, and $G_w$ and outputs corresponding $Va^{ref}$ and $Vb^{ref}$ in a high-frequency voltage calculator 8.

Figure 5:
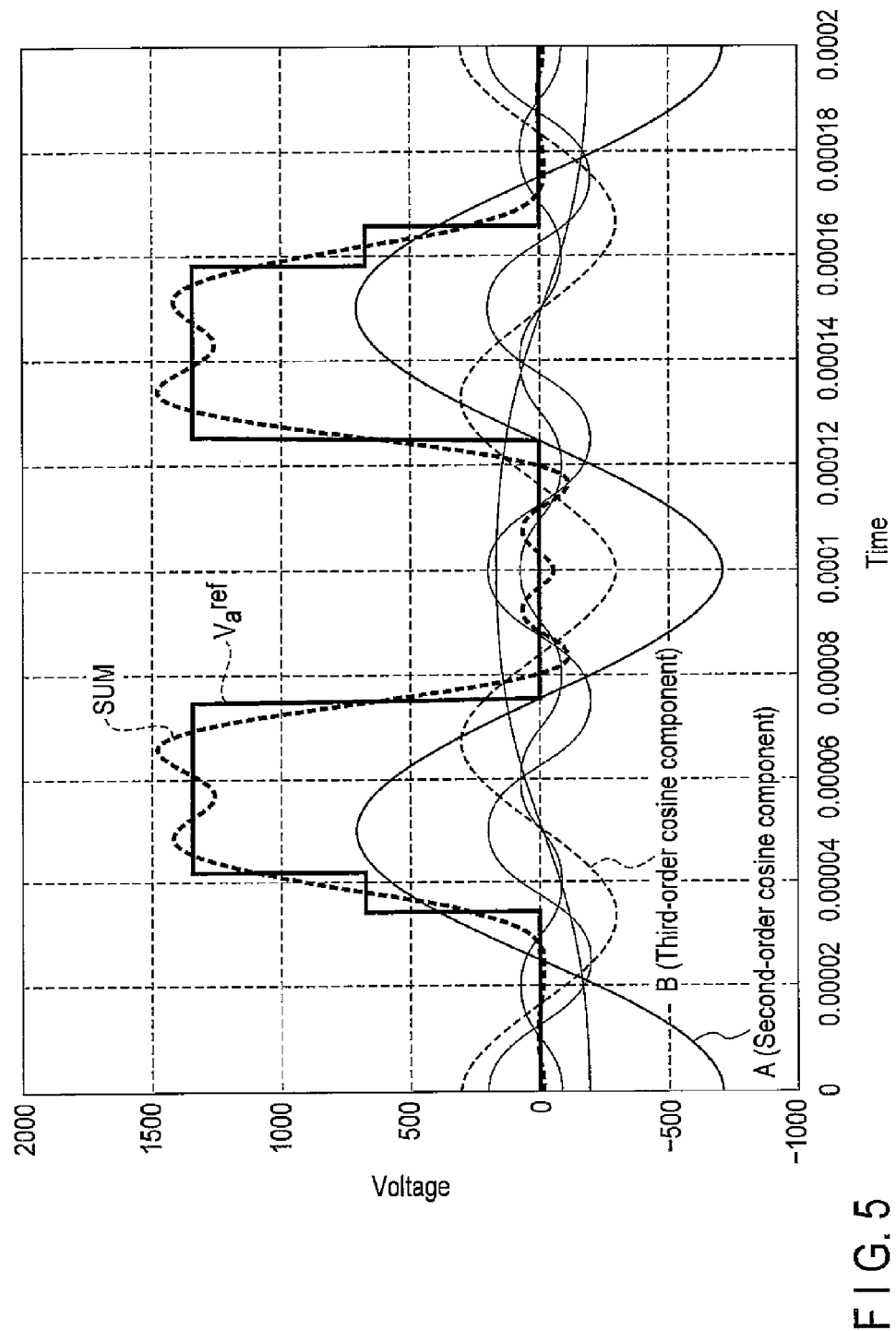
FIG. 5 shows frequency components of a PWM voltage command.

Such voltage commands $Va^{ref}$ and $Vb^{ref}$ after pulse-width modulation are configured by time-based combinations of six non-zero-voltage vectors, which the inverter can output instantaneously, and two zero-voltage vectors, and include high-frequency components not lower than a carrier frequency. Hence, high-frequency components not lower than a carrier frequency but included in a voltage command, i.e., high-frequency components are extracted and graphically expressed as shown in FIG. 5. FIG. 5 shows a result of subjecting only the a-axis direction voltage command $Va^{ref}$ as a target to Fourier series expansion by a carrier cycle, calculating up to fifth-order sine and cosine components of the carrier frequency, and the components layered on a pulse waveform of $V_a^{ref}$. In FIG. 5, a signal "SUM" is a sum of components up to the tenth order. The "SUM" approximates further to $V_a^{ref}$ if addition is performed up to higher orders.

The voltage command $V_a^{ref}$ has the same cycle as a triangle carrier cycle. Accordingly, the voltage command after pulse-width modulation is found to include high-frequency components not lower than the carrier frequency. This can be expressed as Expression 7 by use of Fourier series expansion.

$$V_a^{ref} = \frac{v_{ax0}}{2} + \sum_{n=1}^{\infty} v_{axn}\cos(2n\pi f_c t) + \sum_{n=1}^{\infty} v_{ayn}\sin(2n\pi f_c t)$$

$$V_b^{ref} = \frac{v_{bx0}}{2} + \sum_{n=1}^{\infty} v_{bxn}\cos(2n\pi f_c t) + \sum_{n=1}^{\infty} v_{byn}\sin(2n\pi f_c t)$$

Expression 7 where $f_c$ is a carrier frequency, n is an integer not smaller than 1, and $V_{axn}$, $V_{ayn}$, $V_{bxn}$, and $V_{byn}$ are Fourier series and expressed by Expression 8 below.

$$\begin{cases} v_{axn} = 2f_c \int_{-tc}^{tc} V_a^{ref} \cos(2n\pi f_c t) dt \\ v_{ayn} = 2f_c \int_{-tc}^{tc} V_a^{ref} \sin(2n\pi f_c t) dt \\ v_{bxn} = 2f_c \int_{-tc}^{tc} V_b^{ref} \cos(2n\pi f_c t) dt \\ v_{byn} = 2f_c \int_{-tc}^{tc} V_b^{ref} \sin(2n\pi f_c t) dt \end{cases}$$

Expression 8

(n = 0, 1, 2, ... )
*sin component is not 0.

where $t_c$ is time of a carrier half cycle. Fourier series of Expression 8 each are obtained by calculating integrations of the carrier 1 cycle about a control timing t as a center.

Figure 6:
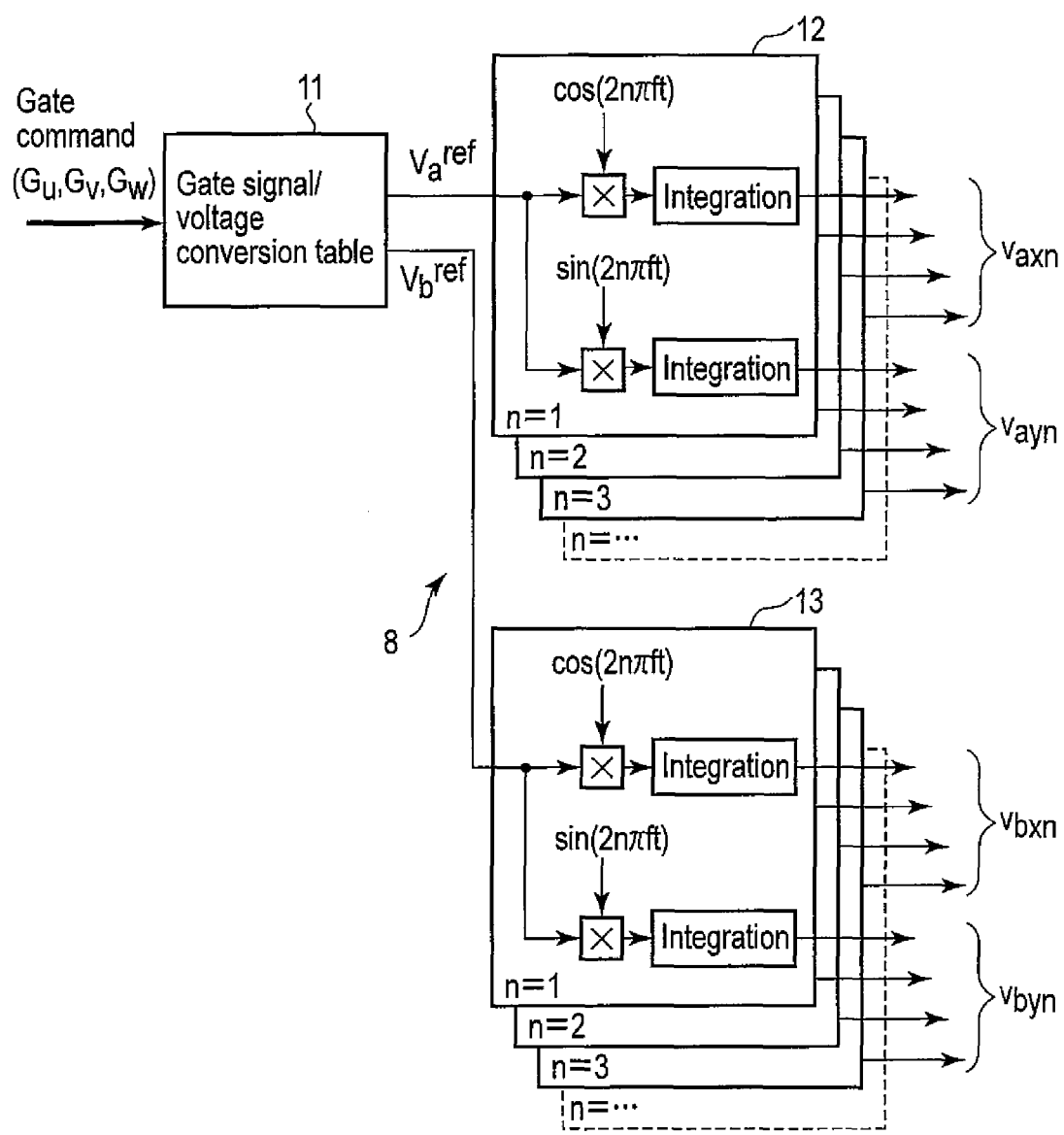
FIG. 6 is a block diagram showing an example configuration of a high-frequency voltage calculator 8.

FIG. 6 is a block diagram showing an example configuration of the high-frequency voltage calculator 8.

The high-frequency voltage calculator 8 generates Fourier series (high-frequency voltage components) $V_{axn}$, $V_{ayn}$, $V_{bxn}$, and $V_{byn}$ by the configuration shown in FIG. 6 based on Expression 8. The "high-frequency voltage" means a sufficiently higher frequency than a rotational frequency of the electric motor in a wide sense in the field of sensorless control. In the present application, Fourier series expansion at a frequency not lower than a carrier frequency is calculated. The carrier frequency is sufficiently higher than the rotational frequency and can be said to be a high frequency. Here, only voltage values used for the Fourier series expansion are used for phase angle estimation. Therefore, the Fourier series at the time of performing the Fourier series expansion can be regarded as high-frequency voltage components.

In FIG. 6, a gate-signal/voltage-conversion table 11 is a lookup table which is input with gate commands Gu, Gv, and Gw from the PWM processing unit 3, outputs corresponding ab-axis voltage commands $Va^{ref}$ and $Vb^{ref}$, and is configured by a ROM. A Fourier series expander 12 expands a voltage command $Va^{ref}$ by Fourier series expansion, and outputs Fourier series (high-frequency voltage components) $V_{axn}$ and $V_{ayn}$. A Fourier series expander 13 expands a voltage command $Vb_{ref}$ by Fourier series expansion, and outputs Fourier series (high-frequency voltage components) $V_{bxn}$ and $V_{byn}$.

As expressed by Expression 7, ab-axis voltage commands after pulse-width modulation each can be expressed as a sum of sin and cosine components at a plurality of frequencies. In the Fourier series expansion expression of Expression 7, individuals of sine and cosine components each have no other frequency component. Further, because of orthogonality of a trigonometric function, sine and cosine components at equal frequencies are independent from each other, i.e., do not include components of each other.

The foregoing high-frequency voltage calculator 8 directly samples gate commands as output from the PWM processing unit 3, and extracts high-frequency components. However, pulse-width modulation algorithms of the system are known. Therefore, the high-frequency voltage calculator 8 may be configured as a system which simulates the PWM processing and separately calculates values equivalent to outputs of the PWM processing unit 3, based on a signal from a preceding stage of the PWM processing unit 3, for example, three-phase voltage commands.

In the present embodiment, high-frequency components as described above are used for angle-of-rotation estimation.

At first, a voltage equation model of Expression 1 is expressed as Expression 9 where the model is expressed on a static coordinate system.

$$\begin{bmatrix} V_a \\ V_b \end{bmatrix} = \qquad \text{Expression 9}$$

$$R\begin{bmatrix} I_a \\ I_b \end{bmatrix} + \begin{bmatrix} L_0 + L_1\cos2\theta & L_1\sin2\theta \\ L_1\sin2\theta & L_0 - L_1\cos2\theta \end{bmatrix}\begin{bmatrix} pI_a \\ pI_b \end{bmatrix} + \begin{bmatrix} e_a \\ e_b \end{bmatrix}$$

where $$L_0 = \frac{L_d + L_q}{2}, \quad L_1 = \frac{L_d - L_q}{2}$$

$$e_a = \omega\phi\sin\theta$$

$$e_b = \omega\phi\cos\theta$$

If only high-frequency components are extracted from Expression 9, only current derivative terms remain and can be expressed as Expression 10.

$$\begin{bmatrix} V_{ahf} \\ V_{bhf} \end{bmatrix} = \begin{bmatrix} L_{00} & L_{01} \\ L_{10} & L_{11} \end{bmatrix}\begin{bmatrix} \dot{I}_{ahf} \\ \dot{I}_{bhf} \end{bmatrix} \qquad \text{Expression 10}$$

where a subscript hf denotes a high-frequency component, and "·" denotes differentiation.

Further, an inductance matrix $L_{00}$ to $L_{11}$ is expressed by Expression 11 below from Expression 9.

$$\begin{bmatrix} L_{00} & L_{01} \\ L_{10} & L_{11} \end{bmatrix} = \begin{bmatrix} L_0 + L_1\cos2\theta & L_1\sin2\theta \\ L_1\sin2\theta & L_0 - L_1\cos2\theta \end{bmatrix} \qquad \text{Expression 11}$$

Taken into consideration that inductance matrices $L_{00}$ to $L_{11}$ are calculated from a voltage and high-frequency components of a current on the basis on Expression 10, high-frequency components of current derivative terms are required. High-frequency components of current derivative terms can be expressed as Expression 12 by using Fourier series expansion, like Expression 7 concerning voltages.

$$\dot{I}_a = \frac{\dot{i}_{a0}}{2} + \sum_{n=1}^{\infty} \dot{i}_{axn}\cos(2n\pi ft) + \sum_{n=1}^{\infty} \dot{i}_{ayn}\sin(2n\pi ft) \qquad \text{Expression 12}$$

$$\dot{I}_b = \frac{\dot{i}_{b0}}{2} + \sum_{n=1}^{\infty} \dot{i}_{bxn}\cos(2n\pi ft) + \sum_{n=1}^{\infty} \dot{i}_{byn}\sin(2n\pi ft)$$

Respective coefficient terms on the right side of Expression 12 above are Fourier series, and can be expressed as Expression 13 below like Expression 8.

$$\begin{cases} \dot{i}_{axn} = 2f_c \int_{-tc}^{tc} \dot{I}_a^{res}\cos(2n\pi f_c t)dt \\ \dot{i}_{ayn} = 2f_c \int_{-tc}^{tc} \dot{I}_a^{res}\sin(2n\pi f_c t)dt \\ \dot{i}_{bxn} = 2f_c \int_{-tc}^{tc} \dot{I}_b^{res}\cos(2n\pi f_c t)dt \\ \dot{i}_{byn} = 2f_c \int_{-tc}^{tc} \dot{I}_b^{res}\sin(2n\pi f_c t)dt \end{cases} \qquad \text{Expression 13}$$

$(n = 0, 1, 2, ...)$

*sin component is not 0.

FIG. 7 is a block diagram showing an example configuration of the high-frequency voltage calculator 7. The high-frequency voltage calculator 7 generates Fourier series (high-frequency voltage components of current derivative terms) $\dot{i}\cdot_{axn}$, $\dot{i}\cdot_{ayn}$, $\dot{i}\cdot_{bxn}$, and $\dot{i}\cdot_{byn}$ by a configuration as shown in FIG. 7 based on Expressions 12 and 13.

In the present specification, "i·" denotes "i̇" and "i·" denotes "İ".

In FIG. 7, a three-phase/ab-axis coordinate converter is input with three-phase-current response values Iu and Iw from a current detector 20, and outputs corresponding ab-axis response values Ia and Ib. A differential value calculator 15 calculates differential values I·a and I·b of the current response values Ia and Ib. A Fourier series expander 16 expands a differential value I·a by Fourier series expansion, and outputs Fourier series (high-frequency voltage components of a current derivative value) $\dot{i}\cdot_{axn}$ and $\dot{i}\cdot_{ayn}$. A Fourier series expander 17 expands a differential value I·b by Fourier series expansion, and outputs Fourier series (high-frequency voltage components of a current derivative value) $\dot{i}\cdot_{bxn}$ and $\dot{i}\cdot_{byn}$.

Here, the high-frequency components $v_{xn}$, $v_{yn}$, $\dot{i}\cdot_{xn}$, and $\dot{i}\cdot_{yn}$ each are independent in view of frequencies, sine, and cosine. Therefore, if sine and cosine components at an equal frequency are extracted from a voltage and a current with respect to the axes a and b, the components can be reconstructed in form of a matrix as expressed by Expression 14 below.

$$\begin{bmatrix} v_{ax1} & v_{ay1} & v_{ax2} & v_{ay2} & \cdots \\ v_{bx1} & v_{by1} & v_{bx2} & v_{by2} & \cdots \end{bmatrix} = \qquad \text{Expression 14}$$

$$\begin{bmatrix} L_{00} & L_{01} \\ L_{10} & L_{11} \end{bmatrix}\begin{bmatrix} \dot{i}_{ax1} & \dot{i}_{ay1} & \dot{i}_{ax2} & \dot{i}_{ay2} & \cdots \\ \dot{i}_{bx1} & \dot{i}_{by1} & \dot{i}_{bx2} & \dot{i}_{by2} & \cdots \end{bmatrix}$$

Figure 8:
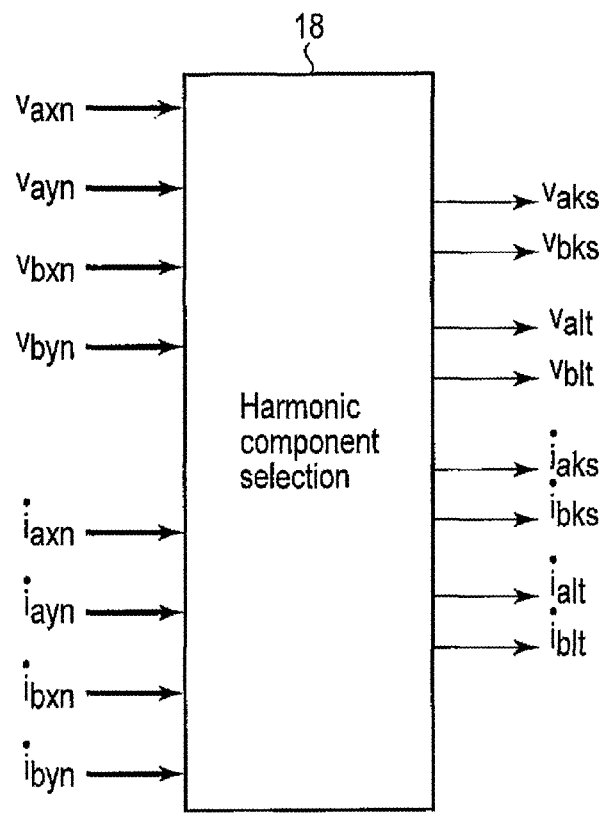
FIG. 8 is a block diagram showing a high-frequency component selector 18.

If only arbitrary two vectors are selected from Expression 14, the vectors can be expressed in form of a 2×2 matrix as shown in Expression 15. FIG. 8 shows a high-frequency component selector 18 which performs such vector selection. The high-frequency component selector 18 is a member comprised in the rotational phase angle estimator 9.

$$\begin{bmatrix} v_{aks} & v_{alt} \\ v_{bks} & v_{blt} \end{bmatrix} = \begin{bmatrix} L_{00} & L_{01} \\ L_{10} & L_{11} \end{bmatrix}\begin{bmatrix} \dot{i}_{aks} & \dot{i}_{alt} \\ \dot{i}_{bks} & \dot{i}_{blt} \end{bmatrix} \qquad \text{Expression 15}$$

In Expression 15, k and l each are at least one of x and y (sine component and cosine component). At this time, k≠l or k=l may be given.

Further, s and t are respectively integers different from each other and ranging from 1 to maximum order m, which have been subjected to Fourier series expansion.

The rotational phase angle estimator 9 can calculate the inductance matrix $L_{00}$ to $L_{11}$ as expressed by Expression 16 below by matrix calculation as expressed by the foregoing Expression 15.

$$\begin{bmatrix} L_{11} & -L_{10} \\ -L_{01} & L_{00} \end{bmatrix} = \qquad \text{Expression 16}$$

$$\frac{L_{00}L_{11} - L_{01}L_{10}}{v_{aks}v_{blt} - v_{alt}v_{bks}}\begin{bmatrix} v_{blt} & -v_{bks} \\ -v_{alt} & v_{aks} \end{bmatrix}\begin{bmatrix} \dot{i}_{aks} & \dot{i}_{bks} \\ \dot{i}_{alt} & \dot{i}_{blt} \end{bmatrix}$$

In Expression 16, transposition is performed by multiplying Expression 15 by an inverse matrix of an inductance matrix in order from the left side. Then, the inductance matrix $L_{00}$ to $L_{11}$ is calculated by using an inverse matrix of a transposed matrix of a voltage matrix.

If the inductance matrix $L_{00}$ to $L_{11}$ is obtained as expressed by Expression 16, the rotational phase angle estimator 9 can obtain the angle of rotation $\theta est$ as expressed by Expression 17 using Expression 11.

$$\theta est = \frac{1}{2}\tan^{-1}\frac{L_{01}+L_{10}}{L_{00}-L_{11}} \qquad \text{Expression 17}$$

As described above, the rotational phase angle estimator 9 estimates the angle of rotation $\theta est$ by using the voltage command value after pulse-width modulation and high-frequency components of a current response value. In the foregoing description, two vectors are extracted from a voltage and high-frequency components of a current derivative value. Alternatively, three or more high-frequency component vectors may be used. In this case, the inductance matrix is calculated from Expression 14, and an inverse matrix cannot be calculated. Therefore, an approximate solution of the inductance matrix is obtained by using a pseudo-inverse matrix. The calculation using three or more vectors can perform calculation from more information than using only two vectors. Therefore, there is an effect in that calculation accuracy increases.

Further, concerning current detection, Expression 12 requires calculation of current derivative terms. However, if sampling by an analog-to-digital converter which obtains a current response value is sufficiently fast, the current derivate terms can be expressed as differences between sampling values, and require no particular processing. Such differences are expressed as I·a and I·b, and Fourier series expansion as expressed by Expression 12 is performed to obtain current derivate terms as expressed by Expression 13. Although adverse influence due to noise is considered by differentiation, a noise component having a much higher frequency than the carrier frequency appears only in high-order components of Expression 12. Unless such high-order components are used for angle-of-rotation estimation calculation, noise components are isolated by frequencies and calculated. Therefore, calculation accuracy can be improved. Further, noise components may be cut off by applying, to a current detection value, a high-pass filter which cuts off high-order components. In this case, a cutoff frequency may be set so as to allow a frequency band required for the angle-of-rotation estimation calculation to pass.

With respect to current sampling used for calculation of the foregoing Expression 12, a current value needs to be detected in synchronism with switching in order to detect high-frequency components. However, the method according to the present embodiment requires no synchronism with switching. Therefore, if only sufficiently fast analog-to-digital conversion sampling performance is achieved, limitations concerning current sampling points are eliminated. Further, conventional current sampling is generally synchronized with a carrier. However, sampling according to the present embodiment needs only to extract frequency components not lower than a carrier frequency, and needs therefore not be synchronized with the carrier. As described above, according to the calculation method of the present embodiment, there is an advantage that sampling management is very simplified compared with conventional method.

As described above, the sensorless control apparatus according to the present embodiment can estimate the phase angle of the rotator without using a rotational phase angle sensor, and accordingly achieve size reduction, cost reduction, and easy maintenance. Further, the rotational phase angle is estimated aiming for voltage commands after pulse-width modulation and high-frequency components of a current response value. In this manner, the rotational phase angle can be estimated accurately without superimposing a high-frequency voltage, and there is a further effect that sampling management for current detection can be facilitated.

Second Embodiment

FIG. 9 is a block diagram showing a configuration of the second embodiment. Components different from the first embodiment will now be described. The same components as those in the first embodiment will be respectively denoted at the same reference signs as those in the first embodiment, and detailed descriptions will be omitted.

A PWM-voltage coordinate converter 20 converts gate commands $G_u$, $G_v$, $G_w$ after pulse-width modulation into voltage commands, and further converts the voltage commands into $V_\gamma^{ref2}$ and $V_\delta^{ref2}$ on a $\gamma\delta$-coordinate system wherein an estimated phase angle $\theta_{est}$ is an angle of rotation. The conversion expression thereof is Expression 18 below, which has the same order as Expression 5.

$$V_\gamma^{ref2} = \sqrt{\frac{2}{3}}\left\{V_u^{ref}\cos(\theta_{est}) + V_v^{ref}\cos\left(\theta_{est}-\frac{2}{3}\pi\right) + V_w^{ref}\cos\left(\theta_{est}+\frac{2}{3}\pi\right)\right\}$$

$$V_\delta^{ref2} = -\sqrt{\frac{2}{3}}\left\{V_u^{ref}\sin(\theta_{est}) + V_v^{ref}\sin\left(\theta_{est}-\frac{2}{3}\pi\right) + V_w^{ref}\sin\left(\theta_{est}+\frac{2}{3}\pi\right)\right\}$$

Expression 18

A high-frequency voltage calculator 21 frequency-resolves (by Fourier series expansion) the voltage commands $V_\gamma^{ref2}$ and $V_\delta^{ref2}$ converted by the PWM-voltage coordinate converter 20, as by Expression 19 similar to Expression 7, and outputs high-frequency components.

$$V_\gamma^{ref} = \frac{v_{ax0}}{2} + \sum_{n=1}^{\infty} v_{axn}\cos(2n\pi f_c r) + \sum_{n=1}^{\infty} v_{ayn}\sin(2n\pi f_c t)$$

$$V_\beta^{ref} = \frac{v_{bx0}}{2} + \sum_{n=1}^{\infty} v_{bxn}\cos(2n\pi f_c r) + \sum_{n=1}^{\infty} v_{byn}\sin(2n\pi f_c t)$$

Expression 19

Similarly, a high-frequency current calculator 22 frequency-resolves (by Fourier series expansion) derivative terms from the current response values $I\gamma^{res}$ and $I\delta^{res}$ converted into the $\gamma\delta$-coordinate system by Expression 20 similar to Expression 12, and outputs high-frequency components.

$$\dot{i}_\gamma = \frac{i_{a0}}{2} + \sum_{n=1}^{\infty} i_{axn}\cos(2n\pi ft) + \sum_{n=1}^{\infty} i_{ayn}\sin(2n\pi ft)$$

Expression 20

-continued $$i_\delta = \frac{i_{b0}}{2} + \sum_{n=1}^{\infty} i_{bxn}\cos(2n\pi ft) + \sum_{n=1}^{\infty} i_{byn}\sin(2n\pi ft)$$

A rotational phase angle estimator 13 estimates the rotational phase angle from the high-frequency voltage components and the high-frequency current components described above by calculation below. At first, from a voltage equation of a synchronous machine on the γδ-coordinate system, terms relating to high-frequency components are extracted to obtain Expression 21 below from consideration as Expression 10.

$$\begin{bmatrix} V_{\gamma hf} \\ V_{\delta hf} \end{bmatrix} = \begin{bmatrix} L'_{00} & L'_{01} \\ L'_{10} & L'_{11} \end{bmatrix} \begin{bmatrix} i_{\gamma hf} \\ i_{\delta hf} \end{bmatrix} \qquad \text{Expression 21}$$

where a inductance matrix $L'_{00}$ to $L'_{11}$ is expressed by Expression 22 below from Expression 9.

$$\begin{bmatrix} L'_{00} & L'_{01} \\ L'_{10} & L'_{11} \end{bmatrix} = \begin{bmatrix} L_0 + L_1\cos 2\Delta\theta & L_1\sin 2\Delta\theta \\ L_1\sin 2\Delta\theta & L_0 - L_1\cos 2\Delta\theta \end{bmatrix} \qquad \text{Expression 22}$$

Like Expression 16 of the first embodiment, a rotational phase angle estimator 13 calculates inductances as expressed by Expression 23 below, and can thereby obtain an angle-of-rotation estimation error $\Delta\theta$ as expressed by Expression 24, based on high-frequency components of $V_\gamma^{ref2}$, $V_\delta^{ref2}$, $I_\gamma^{res}$, and $I_\delta^{res}$ having frequencies, sine components, and cosine components corresponding to each other.

$$\begin{bmatrix} L'_{11} & -L'_{10} \\ -L'_{01} & L'_{00} \end{bmatrix} = \qquad \text{Expression 23}$$

$$\frac{L'_{00}L'_{11} - L'_{01}L'_{10}}{v_{\gamma 1}v_{\delta 2} - v_{\gamma 2}v_{\delta 1}} \begin{bmatrix} v_{\delta 2} & -v_{\delta 1} \\ -v_{\gamma 2} & v_{\gamma 1} \end{bmatrix} \begin{bmatrix} i_{\gamma 1} & i_{\delta 1} \\ i_{\gamma 2} & i_{\delta 2} \end{bmatrix}$$

$$\Delta\theta = \frac{1}{2}\tan^{-1}\frac{L'_{01} + L'_{10}}{L'_{00} - L'_{11}} \qquad \text{Expression 24}$$

Further, as a feature of angle-of-rotation estimation calculation in the present embodiment, information of $\Delta\theta$ can be obtained without using inverse tangent calculation by approximation of $\sin 2\Delta\theta \approx 2\Delta\theta$ in Expression 22 where $\Delta\theta \approx 0$. That is, Expression 25 exists where $\Delta\theta \approx 0$.

$$\Delta\theta = \frac{L'_{01}}{2L_1} \qquad \text{Expression 25}$$

Since $L_1$ is a constant, $L'_{01}$ can therefore be regarded as an estimated angle-of-rotation error $\Delta\theta$. Naturally, the error can be obtained from $L'_{10}$. If an average between $L'_{01}$ and $L'_{10}$ is calculated, influence from individual calculation errors can be reduced.

Figure 10:
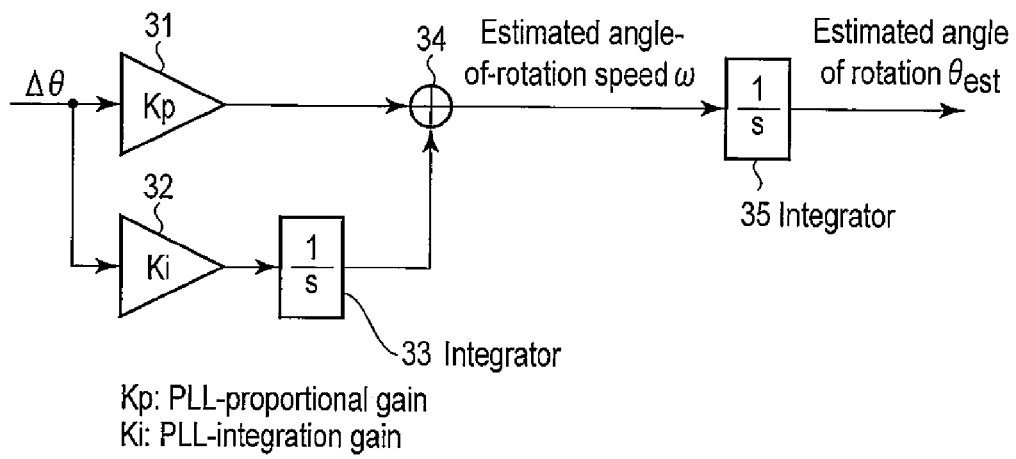
FIG. 10 is a block diagram of an angle-of-rotation estimation calculation PLL.

If information of the angle-of-rotation estimation error $\Delta\theta$ can be obtained by Expression 25 above, the estimated phase angle $\theta_{est}$ can be easily converged on an actual angle of rotation θ by configuring a phase locked loop (PLL) so as to converge $\Delta\theta$ on zero. FIG. 10 is a block diagram of such a PLL, and the PLL is a component comprised in a high-frequency component selector 9. In the figure, the angle-of-rotation estimation error $\Delta\theta$ is amplified by a PLL proportional gain Kp at an amplifier 31, and is then input to an adder 34. In the figure, the angle-of-rotation estimation error $\Delta\theta$ is amplified by a PLL proportional gain Kp at an amplifier 32, is integrated by an integrator 33, and is then input to an adder 34. Output values from the amplifier 31 and integrator 33 are added up by the adder 34, and a result thereof is input as an estimated angle-of-rotation speed ω to the integrator 35. The integrator 35 integrates the angle speed ω, and outputs the estimated phase angle $\theta_{est}$.

In the PLL shown in FIG. 10, the estimated output-phase angle $\theta_{est}$ varies in accordance with the value of the estimated angle-of-rotation error $\Delta\theta$. However, when the estimated error $\Delta\theta$ is zero, the estimated output-phase angle $\theta_{est}$ does not vary.

Figure 11:
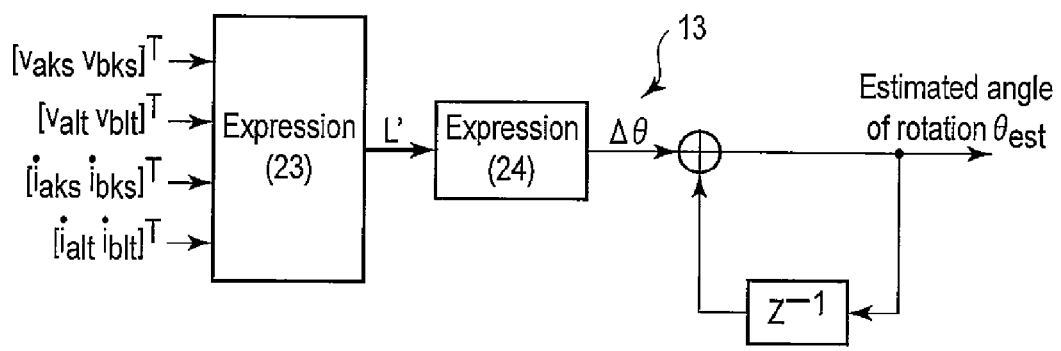
FIG. 11 is a block diagram showing a configuration of a rotational phase angle estimator 13.

If the estimated error $\Delta\theta$ is calculated in accordance with Expressions 23 and 24 and if $\Delta\theta$ itself is added to the estimated phase angle $\theta_{est}$, a new estimated phase angle corresponding to an actual angle of rotation θ can be directly obtained. FIG. 11 shows an example configuration to practice this method. In the configuration, the estimated phase angle $\theta_{est}$ is obtained by adding $\Delta\theta$ to a previous calculation value ($Z^{-1}$). In this method, a processing such as a PLL is not required, and there is an effect that calculation is simplified. However, in general, a parameter such as L1 includes an error depending on temperature change and a phenomenon of magnetic flux saturation. Therefore, obtained $\Delta\theta$ also includes an error. Further, a high-frequency voltage value and a high-frequency current value also include detection errors and calculation errors. Therefore, $\Delta\theta$ basically includes an error. Since such an error varies each time control calculation is performed, the error directly influences even an estimated phase angle which is directly obtained at a relatively high frequency. On the other side, if a PLL is used as shown in FIG. 10, calculation which obtains an estimated phase angle from $\Delta\theta$ can have a function of low-pass filter. Therefore, influence of an error at a high frequency, which is included in the estimated error $\Delta\theta$ as described above, can be prevented from appearing in the estimated phase angle.

As described above, the sensorless control apparatus according to the present embodiment can estimate the phase angle of the rotator without using a rotational phase angle sensor, and can therefore achieve size reduction, cost reduction, and easy maintenance. Further, the rotational phase angle is estimated aiming for a voltage command after pulse-width modulation and a high-frequency component of a current response value. In this manner, the rotational phase angle can be estimated accurately without superimposing a high-frequency voltage. Also according to the present embodiment, an effect is obtained in that sampling management in current detection can be facilitated. Besides, calculation can be simplified and influence of errors can be reduced.

Third Embodiment

Next, the third embodiment will be described.

In the present embodiment, a high-frequency voltage value and a high-frequency current value are obtained from a voltage command value and a current response value after pulse-width modulation. The present embodiment employs the same calculation as the first and second embodiments up to obtaining of an inductance matrix but employs different calculation after obtaining the inductance matrix up to the obtaining of an estimated phase angle. That is, the internal configuration of each rotational phase angle estimator differs. Therefore, a block diagram showing the configuration of the present embodiment will be omitted.

In a synchronous motor, when high load (high torque) is applied, a current which is made flow through the motor increases, and an amount of magnetic flux perpendicular to a rotator increases. This gives rise to a phenomenon that magnetic flux saturates and reduces an inductance. In addition, a saturation state thereof varies depending on phases of the current. Therefore, when the estimated phase angle happens to include an error, gate commands generated on the basis of the estimated value also include an error. As a result, a phase of a flowing current shifts from an ideal value, and a state of inductance saturation also varies. Since the magnetic flux saturates, the inductance cannot be expressed by simple models such as Expressions 11 and 23. Experimentally, $L_0$ and $L_1$ are known to vary in accordance with variation of the current phase and variation of the estimated error. If $L_0$ and $L_1$ which are regarded as constants vary, $\theta$ and $\Delta\theta$ cannot correctly be obtained any more.

However, in angle-of-rotation estimation of the present embodiment, consideration is taken into obtaining a characterizing amount R having a property of being proportional to $\Delta\theta$ without directly obtaining $\theta$ or $\Delta\theta$, after obtaining an inductance matrix. For example, if $L_0$ has a property of being substantially proportional to $\Delta\theta$ under predetermined torque conditions, the characterizing amount R can be obtained by Expression 26.

$$R = L'_{00} + L'_{11} = 2L_0 \propto \Delta\theta \qquad \text{Expression 26}$$

where $L'_{00}$ and $L'_{11}$ are inductances which are calculated based on high-frequency components of voltage command values $V_\gamma^{ref2}$ and $V_\delta^{ref2}$ and current response values $I_\gamma^{res}$ and $I_\delta^{res}$, as expressed in Expression 23 in the foregoing embodiment 2.

When the phenomenon of magnetic flux saturation occurs, $L_1$ becomes close to zero and makes calculation of Expression 25 difficult in the foregoing second embodiment. In this case, the phenomenon of magnetic flux saturation can be coped with if estimation calculation is performed based on the characterizing amount R using $L_0$ without using $L_1$.

Figure 12:
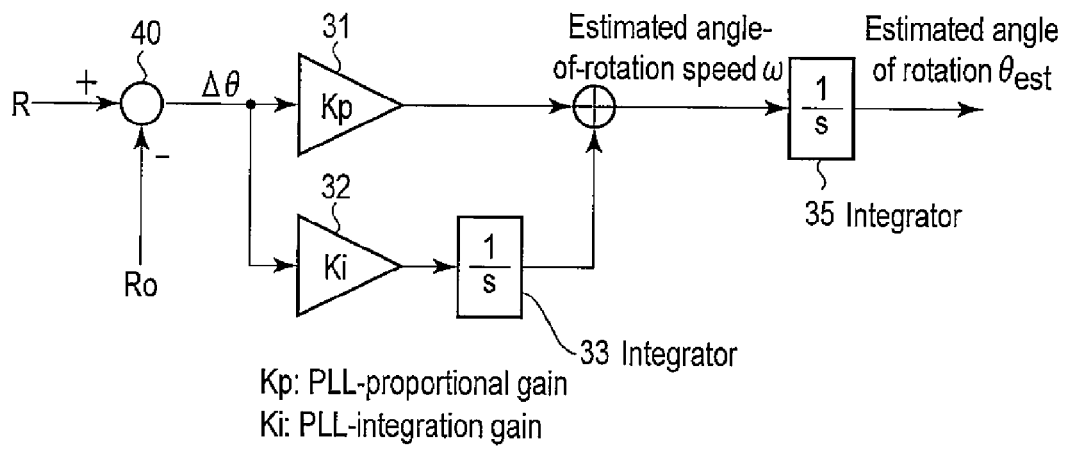
FIG. 12 shows an example circuit configuration of a circuit which calculates an estimated phase angle, based on a characterizing amount R and an offset amount.

If the characterizing amount R is obtained, an estimated angle-of-rotation error can be converted into zero by inputting R in place of $\Delta\theta$ by using the PLL shown in FIG. 10. The characterizing amount R has a proportional relationship with an offset to $\Delta\theta$ in some cases. In this case, an offset amount may be measured/set in advance and then be subtracted. FIG. 12 shows an example circuit configuration of calculating an estimated phase angle θest, based on the characterizing amount R and offset amount. The circuit is comprised in the rotational phase angle estimator. According to this circuit configuration, in front of the PLL expressed in FIG. 10, there is added a subtractor 40 which subtracts an offset amount $R_0$ for the characterizing amount from the characterizing amount R expressed by Expression 26. There is a case where the offset amount $R_0$ varies under conditions about torque and a current. In this case, for example, a parameter table may be provided and set in advance, and may be referred to, depending on operating conditions.

As described above, the sensorless control apparatus according to the present embodiment can estimate the phase angle of the rotator without using a rotational phase angle sensor, and can achieve size reduction, cost reduction, and easy maintenance. Further, the rotational phase angle is estimated aiming for a voltage command after pulse-width modulation and a high-frequency component of a current response value. In this manner, the rotational phase angle can be estimated accurately without superimposing a high-frequency voltage. Further, the present embodiment can cope with even a state that magnetic flux saturation occurs during high load and causes inductances to vary.

Fourth Embodiment

Figure 13:
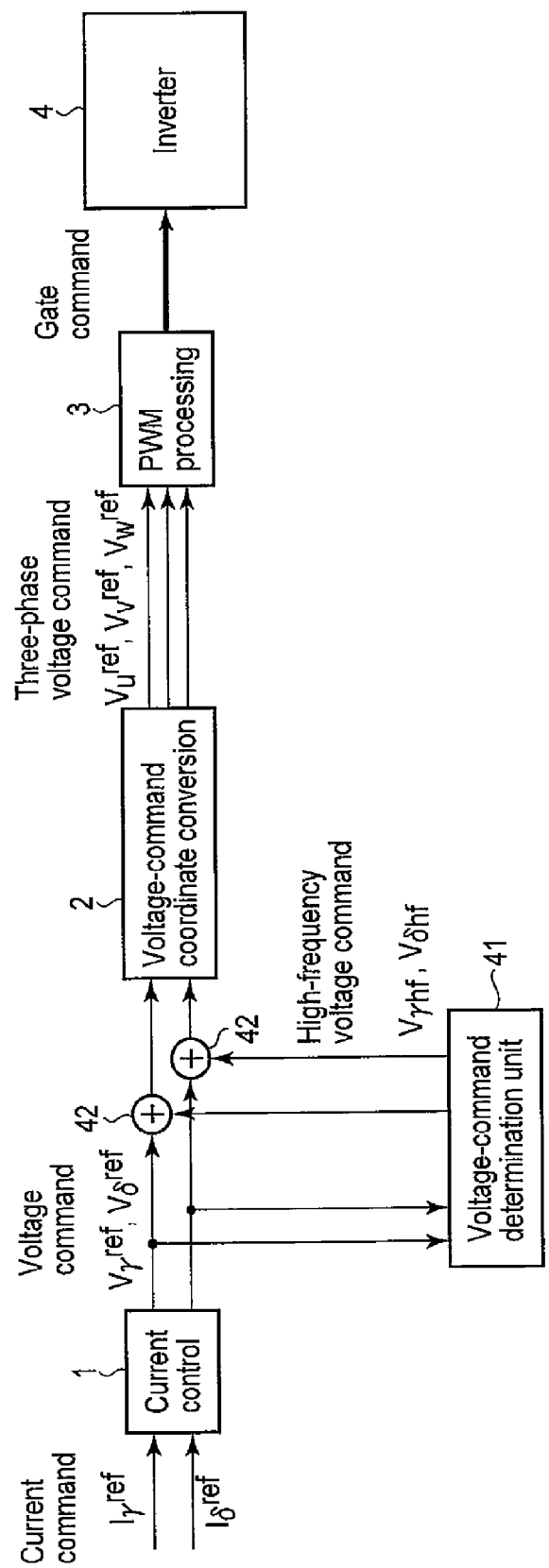
FIG. 13 is a block diagram showing a configuration of a sensorless control apparatus according to the fourth embodiment.

FIG. 13 is a block diagram showing a configuration of the fourth embodiment. The present embodiment can be added to the first or second embodiment.

The voltage command determination unit 41 regards voltage commands $V_\gamma^{ref}$ and $V_\delta^{ref}$ for controlling an electric motor as a voltage command vector $V^{ref}$, and determines whether the direction of the voltage command vector $V^{ref}$ is in the vicinity of the direction of a non-zero-voltage vector of an inverter or not. The voltage-command determination unit 41 is a component which can be suitably added to the first or second embodiment. If the direction is determined to be in the vicinity, the voltage-command determination unit 41 superimposes, on the voltage command vector, a high-frequency voltage Vhf in a direction perpendicular to the voltage command vector, in order that the direction shifts away from the vicinity. The high-frequency voltage $V_{hf}$ is superimposed for a reason described later.

Figure 14:
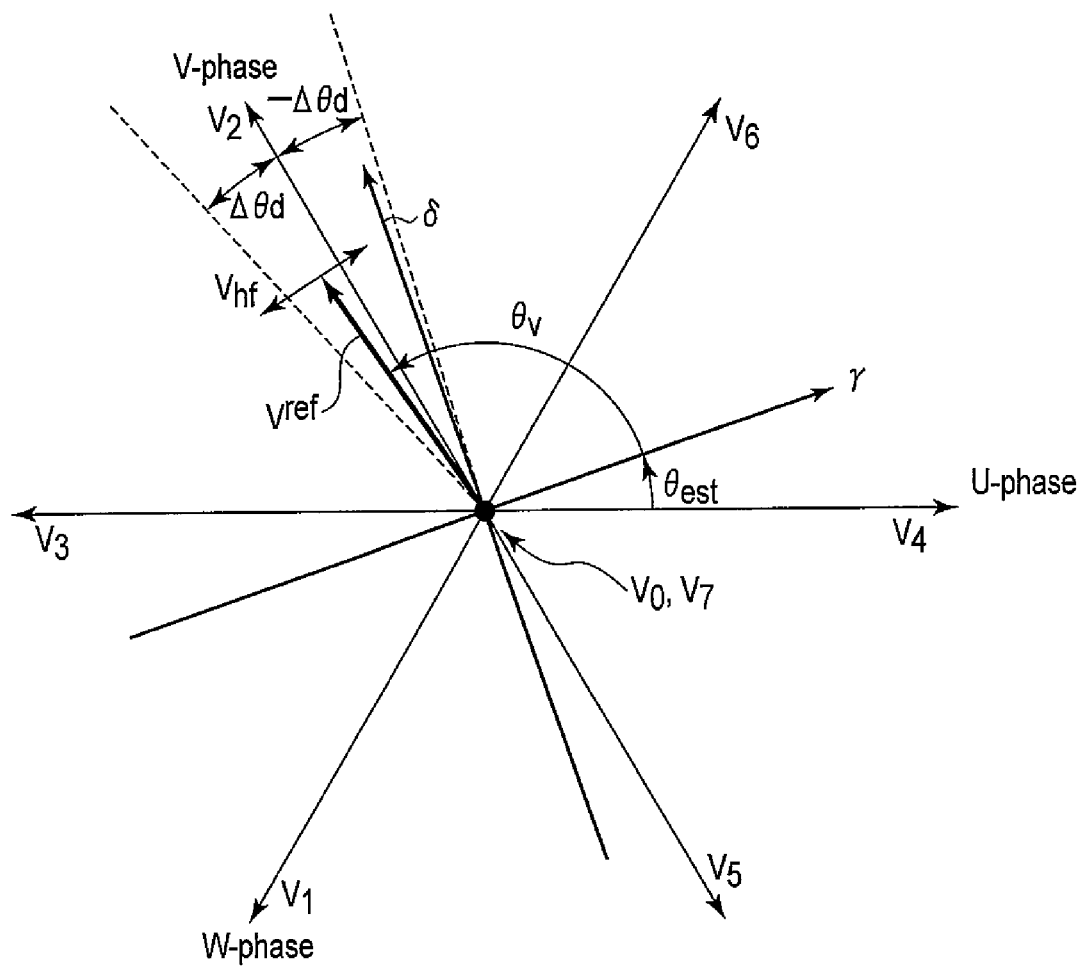
FIG. 14 is a vector diagram showing operation of the fourth embodiment.

FIG. 14 is a vector diagram showing operation of the present embodiment. In FIG. 14, an output-voltage command vector $V^{ref}$ configured by $(V_\gamma^{ref}, V_\delta^{ref})$ is calculated with respect to an axes γ and δ at an angle of an estimated phase angle $\theta_{est}$. At this time, supposing that a phase angle of $V^{ref}$ from axis γ is θv, whether $V^{ref}$ is in the vicinity of a non-zero-voltage vector of the inverter or not can be determined by Expression 27 below.

$$\theta_{Vinv} - \Delta\theta_d \leq \theta_v + \theta_{est} \leq \theta_{Vinv} + \Delta\theta_d \qquad \text{Expression 27}$$

where $\theta_{Vinv} = 0°, 60°, 120°, 180°, 240°$, or $300°$ and $\Delta\theta_d$ is a constant for determining what range of orders to be regarded as the vicinity.

Where Expression 27 exists, voltage-command determination unit 41 calculates and outputs a high-frequency voltage $V_{hf}$ (=$V_{\gamma hf}, V_{\delta hf}$) in the direction of $\theta_v + 90°$.

$$\begin{cases} V_{\gamma hf} = V_{hf} \sin(2\pi f_{hf} t) \cos\left(\theta_v + \frac{\pi}{2}\right) \\ V_{\delta hf} = V_{hf} \sin(2\pi f_{hf} t) \sin\left(\theta_v + \frac{\pi}{2}\right) \end{cases} \qquad \text{Expression 28}$$

$V_{hf}$ is a high-frequency voltage amplitude and is a parameter to be set to a predetermined value in advance.

Further, $f_{hf}$ is a high frequency and is set to a frequency not lower than a carrier frequency. The high-frequency voltage $V_{\gamma hf}$ and $V_{\delta hf}$ are added to voltage commands $V_\gamma^{ref}$ and $V_\delta^{ref}$ by an adder 42, and are supplied to a voltage-command coordinate converter 2.

Described next will be the reason for and operation of the configuration as described above.

In the angle-of-rotation estimation methods described in the first and second embodiments, a voltage and a current are decomposed into frequency components, sine components, and cosine components. Based on respectively corresponding high-frequency components, a matrix is configured thereby to directly calculate an inductance matrix or an estimated phase angle through matrix calculation. However, the calculation cannot be completed in some cases. That is, there is a case where no inverse matrix of high-frequency components exists in Expressions 16 and 23.

Presence of an inverse matrix can be determined by whether a matrix expression is zero or not, and more intuitively by whether a column vectors forming the matrix have components spatially perpendicular to each other or not. That is, in Expression 16, if vectors $[V_{aks} \ V_{bks}]^T$ and $[V_{alt} \ V_{blt}]^T$ satisfy a relationship of linear independence, an inverse matrix exists (where suffix T denotes a transposed vector).

These voltage vectors are sine or cosine components at a specific frequency, which are included in voltage command values after pulse-width modulation, the command values being calculated by Expression 8. Therefore, whether the condition described above is satisfied or not can be estimated in advance. That is, if none of all the high-frequency voltage components calculated by Expression 8 are linearly independent or, in other words, if all the high-frequency voltage components satisfy the relationship of linear dependence, the direction of the output-voltage command vector before pulse-width modulation matches any of six non-zero-voltage vectors of the inverter.

Figure 15:
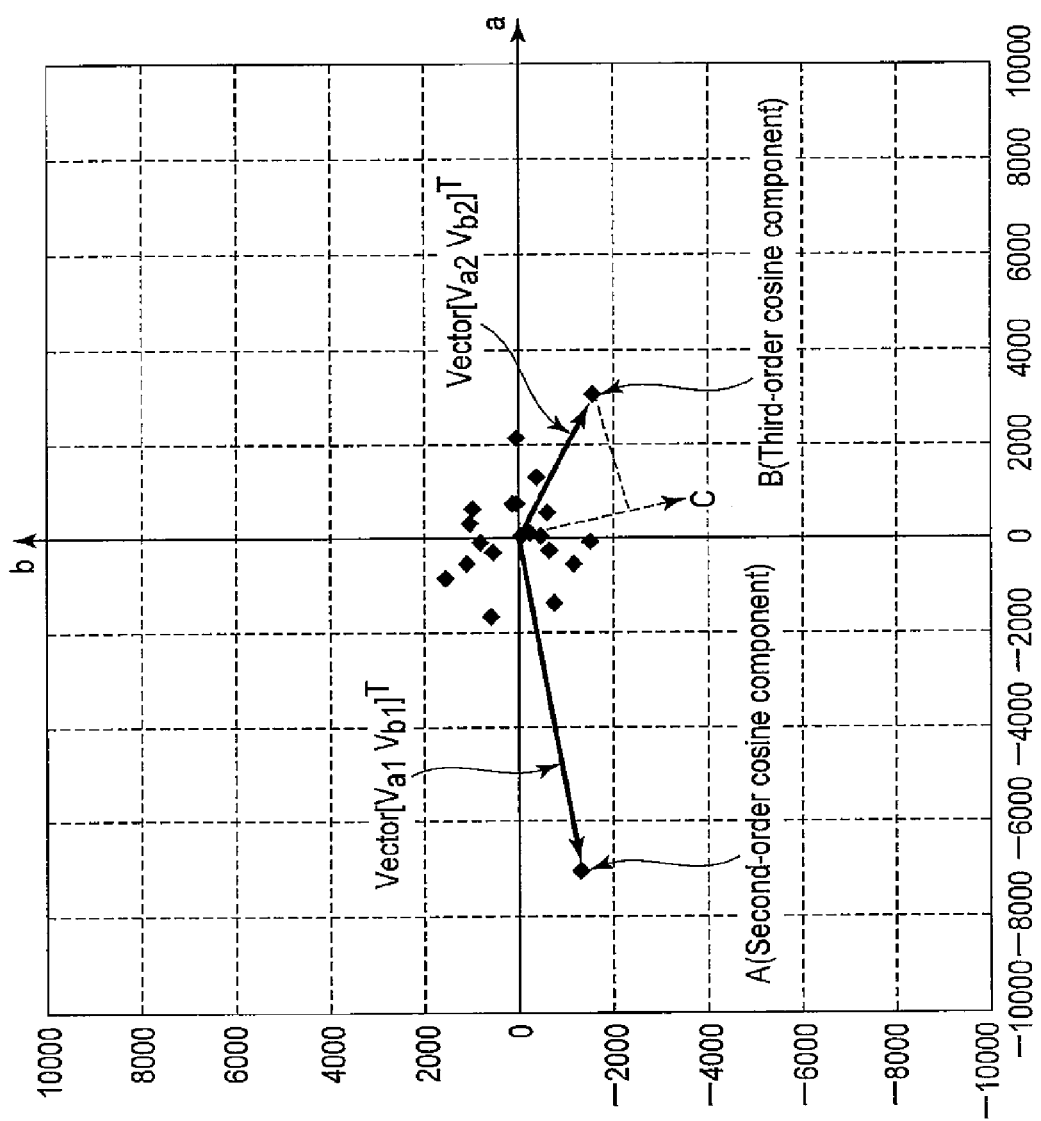
FIG. 15 plots components of a high-frequency voltage.

For example, FIG. 15 shows an example in which $V_a^{ref}$ and $V_b^{ref}$ shown in (c) of FIG. 3 are decomposed into high-frequency components, and plotted as vectors. Where vectors from an origin to points A and B are respectively expressed as $[v_{a1} \ v_{b1}]^T$ and $[v_{a2} \ v_{b2}]^T$, vectors to other points have components in directions perpendicular to vectors $[v_{a1} \ v_{b1}]^T$ and $[v_{a2} \ v_{b2}]^T$. Here, point A is obtained by plotting second-order (n=2) cosine components $v_{ax2}$ and $v_{bx2}$ in components obtained by Fourier series expansion of $V_a^{ref}$ and $V_b^{ref}$, as well as point B by plotting third-order (n=3) cosine components $v_{ax3}$ and $v_{bx3}$ (the other points are obtained by plotting components other than the cosine components at n=2 and 3). Vector $[v_{a1} \ v_{b1}]^T$ denoted at point A is a second-order cosine component, corresponding to a waveform A shown in FIG. 5. Vector $[v_{a2} \ v_{b2}]^T$ is a third-order cosine component, corresponding to a waveform B in FIG. 5. Further, vector $[v_{a1} \ v_{b1}]^T$ also expresses a component having the greatest amplitude (absolute value) among high-frequency components obtained by performing Fourier series expansion on $V_a^{ref}$ and $V_b^{ref}$. Vector $[v_{a2} \ v_{b2}]^T$ also expresses a component having the second greatest amplitude (absolute value) among the high-frequency components.

Figure 16:
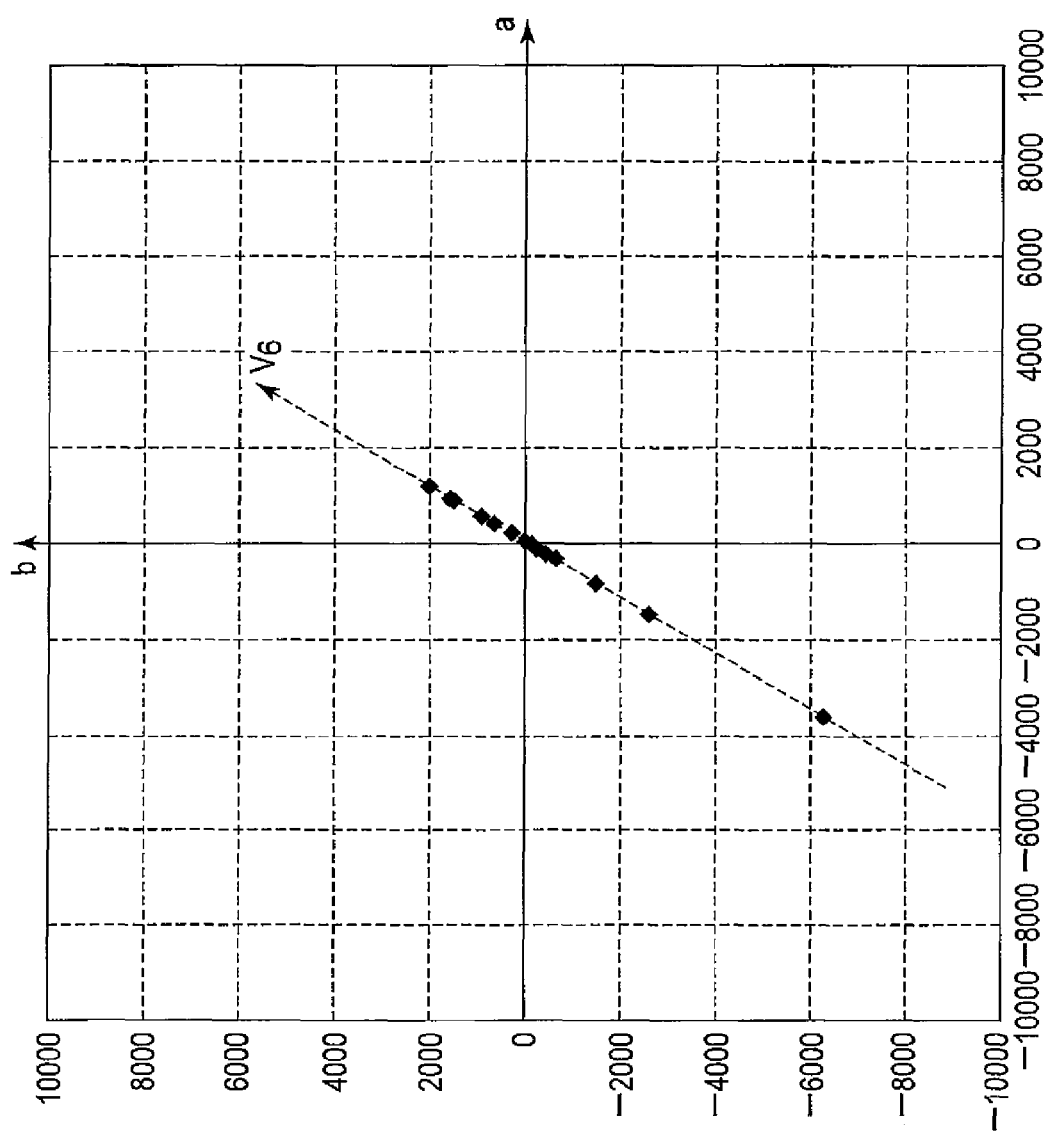
FIG. 16 plots components of a high-frequency voltage.

On the other side, FIG. 16 shows an example of plotting high-frequency components of voltage commands for which directions of output-voltage command vectors $V_\gamma^{ref}$ and $V_\delta^{ref}$ before pulse-width modulation match non-zero-voltage vectors of the inverter. FIG. 16 shows a case where the output-voltage command vector is in the direction of $V_6$. As can be seen from FIG. 16, all high-frequency components found to be in one line and satisfy the relationship of linear dependence. In this case, the calculation of neither Expression 16 nor 23 exists, and accordingly, angle-of-rotation estimation is impossible.

Therefore, in the case as described above, the present embodiment arranges the output voltage command vectors so as not to match the non-zero-voltage vectors, by superimposing a high-frequency voltage on directions perpendicular to the output voltage command vectors $V_\gamma^{ref}$ and $V_\delta^{ref}$. Accordingly, a high-frequency voltage vector used for angle-of-rotation estimation calculation can securely satisfy the relationship of linear independence, and angle-of-rotation estimation can be securely performed.

Similarly, when the output-voltage command vector is small, the high-frequency-voltage component values can not sufficiently be obtained. Therefore, corresponding high-frequency current differentiation components are too small to perform angle-of-rotation estimation. This problem can be avoided by superimposing a sufficiently large high-frequency voltage vector on a direction which does not match the non-zero-voltage vectors. Such high-frequency voltages $V_{\gamma hf}$ and $V_{\delta hf}$ (alternating high-frequency waves) are expressed by Expression 29 below.

$$\begin{cases} V_{\gamma hf} = V_{hf}\sin(2\pi f_{hf} t)\cos(\theta_{vhf} - \theta_{est}) \\ V_{\delta hf} = V_{hf}\sin(2\pi f_{hf} t)\sin(\theta_{vhf} - \theta_{est}) \end{cases} \quad \text{Expression 29}$$

Figure 17:
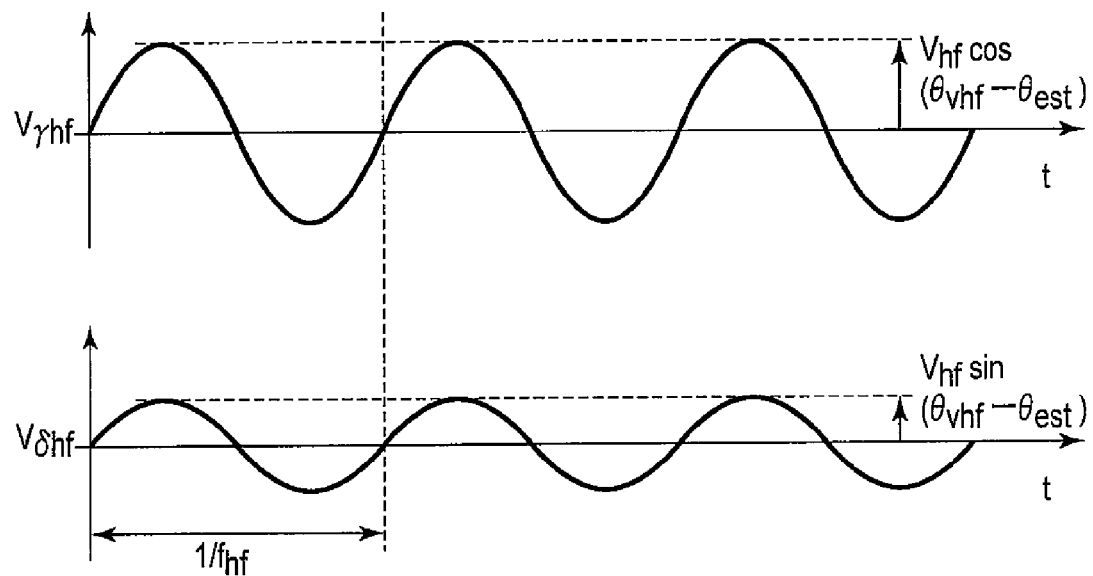
FIG. 17 is a waveform diagram showing a high-frequency voltage command.
Figure 18:
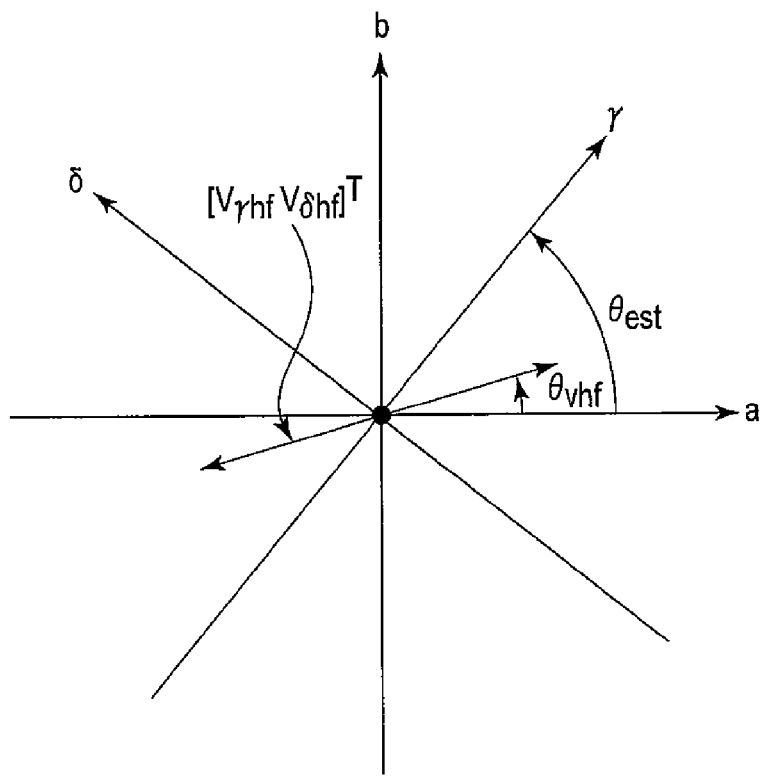
FIG. 18 defines a phase angle of a high-frequency voltage command.

FIG. 17 shows examples of waveforms of such alternating high-frequencies. FIG. 18 shows a definition of a phase of Expression 29. $\theta_{vhf}$ takes a value other than 0°, 60°, 120°, 180°, 240°, and 300° and desirably an intermediate value therebetween, for example, 30°, 90°, 150°, 210°, 270°, or 330°. These angles correspond to intermediate directions of the directions of the non-zero-voltage vectors, and are therefore effective in that high-frequency voltage components having the relationship of linear independence can be easily obtained.

The present embodiment uses an alternating high-frequency in a predetermined direction shown in FIGS. 17 and 18, as a high-frequency voltage to be superimposed on the voltage commands $V_\gamma^{ref}$ and $V_\delta^{ref}$ by the voltage command determination unit 41. However, the high-frequency voltage to be superimposed may be of any form, for example, a rotational high-frequency, insofar as the effects as described above are obtained (for example, to obtain high-frequency voltage components having the relationship of linear independence).

The frequency of the high-frequency voltage needs to be at least equal to or lower than a carrier frequency since superimposed output voltage commands are subjected to pulse-width modulation by the pulse-width modulator 3. This is because a high-frequency higher than a carrier frequency is not correctly reflected on an output voltage from the principle of PWM.

Inversely, a lower limit to the frequency may be set to be as sufficiently high as tolerable torque pulsation since a high-frequency current which flows because of the high-frequency voltage can become torque pulsation. In general, the carrier frequency is far higher than a torque pulsation frequency which is mechanically tolerable. Therefore, a frequency band of the high-frequency voltage can be sufficiently wide.

Although the high-frequency voltage is expressed as a sine wave in Expressions 28 and 29, a rectangular-wave alternating voltage may alternatively be used for simplification. In this manner, control calculation can be simplified.

In addition, as is applicable to all the foregoing embodiments, conditions for high-frequency voltage components for performing angle-of-rotation estimation may be directly used as conditions for high-frequency current components if only the calculation method is changed. That is, although matrix calculation is performed to estimate an angle of rotation from Expression 15, an inductance matrix can be calculated even in a method of calculating an inverse matrix of a current in place of an inverse matrix of a voltage. In this case, the conditions for the voltage need to be directly applied as conditions for the current. Further in this case, a high-frequency voltage to be superimposed to complete calculation can be substituted with high-frequency current command values. In a case of superimposing the high-frequency current command values, current command values input to the current controller may be added with the high-frequency current command values.

Further to perform calculation with high accuracy, more desirably, the high-frequency component vectors of the voltage and current have as great absolute values as possible.

For example, in FIG. 15, a component having the greatest absolute value is adopted as a point A, and a component having the second greatest absolute value is adopted as a point B, among calculated high-frequency voltage components. By selecting the points in this manner, calculation accuracy can be improved more than adopting other points.

In addition, further another method for improving calculation accuracy is to make selection so as to increase an exterior product of two vectors $[v_{a1}, v_{b1}]^T$ and $[v_{a2}, v_{b2}]^T$ which form a voltage matrix. By selection as described above, a denominator of a coefficient term of Expression 16 increases, and calculation can be completed with high accuracy. Such a selection processing for selecting vectors (high-frequency components) is carried out by a high-frequency component selector 18 shown in FIG. 8.

That is, the high-frequency component selector 18 firstly searches for and selects a vector having the greatest absolute value. Next, the selector 18 selects another vector which produces the greatest exterior product with the selected vector. Specifically, another vector having the greatest component is selected in a direction perpendicular to the selected greatest vector. Where exemplified in FIG. 15, a vector having the greatest absolute value, i.e., a vector $[v_{a1}, v_{b1}]^T$ is selected. Next, another vector is selected which has the greatest component in a direction C perpendicular to vector $[v_{a1}, v_{b1}]^T$. In this example, both of this vector and the vector having the second greatest absolute value are $[v_{a2}, v_{b2}]^T$ and thus match each other. However, there is a case where the vectors do not match each other. That is, an inductance matrix is desirably calculated by selecting combinations of the greatest vector and all the other vectors are selected and by searching for a pair which maximizes the exterior product.

As described above, the sensorless control apparatus according to the present embodiment can estimate the phase angle of the rotator without using a rotational phase angle sensor, and can therefore achieve size reduction, cost reduction, and easy maintenance. Further, the rotational phase angle is estimated aiming for voltage commands after pulse-width modulation and high-frequency components of a current response value. In this manner, the rotational phase angle can be estimated accurately by superimposing a minimum frequency voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensorless control apparatus for a synchronous motor, comprising:
   a current controller which is input with current commands and current responses, and which outputs voltage commands;
   a voltage-command coordinate converter which performs coordinate conversion on the voltage commands based on an estimated phase angle to obtain three-phase voltage commands;
   a PWM processing unit which pulse-width-modulates each three-phase voltage command, based on comparison between the three-phase voltage command and a PWM carrier, and thereby generates a gate command for an inverter;
   a high-frequency voltage calculator which obtains a plurality of high-frequency voltage components by calculating an applying voltage value applied to the synchronous motor from the inverter using an output signal of the PWM processing unit, and calculating sine components and cosine components of a plurality of frequencies not lower than a carrier frequency of the PWM carrier included in the applying voltage value;
   a high-frequency current calculator which obtains a plurality of high-frequency current components by calculating said sine components and cosine components of the plurality of frequencies not lower than the carrier frequency, wherein said plurality of high-frequency voltage components are included in a current response value from the synchronous motor driven by the inverter; and
   an estimated angle calculator which calculates the estimated phase angle indicative of an estimated value of an angle of rotation of the synchronous motor, based on two pairs selected from a plurality of pairs each including the high-frequency voltage component and the high-frequency current component each of which includes a cosine component and a sine component at an equal frequency,
   wherein one of the selected high-frequency voltage components has a greatest absolute value and another one of the selected high-frequency voltage components has greatest components in a direction perpendicular to the one of the selected high-frequency voltage components.

2. The apparatus according to claim 1, wherein the high-frequency voltage calculator converts the gate command into an output voltage command on a static orthogonal coordinate system of the synchronous motor, and calculates each high-frequency voltage component, based on the output voltage command, and
   wherein the high-frequency current calculator converts the current response value of the synchronous motor into a current response value on a standstill orthogonal coordinate system of the synchronous motor, and calculates each high-frequency current component, based on the current response value.

3. The apparatus according to claim 2, wherein the estimated angle calculator comprises:
   a first calculator which calculates an inductance of the synchronous motor, based on the selected two pairs of the high-frequency voltage component and the high-frequency current component; and
   a second calculator which calculates the estimated phase angle of the synchronous motor, based on the inductance.

4. The apparatus according to claim 2, further comprising a voltage command determination unit which superimposes, on an output-voltage command value, a high-frequency voltage in a direction perpendicular to the output-voltage command value, at a frequency not higher than the PWM carrier frequency, when a direction of the output-voltage command value to the inverter before the pulse-width modulation is in a vicinity of a direction of a non-zero-voltage vector of the inverter.

5. The apparatus according to claim 2, further comprising a voltage command determination unit which superimposes, on an output-voltage command value, a high-frequency voltage in a direction different from a non-zero-voltage vector of the inverter, at a frequency not higher than the PWM carrier frequency, when a size of the output-voltage command value to the inverter before the pulse-width modulation is equal to or smaller than a predetermined value.

6. An inverter apparatus comprising:
the sensorless control apparatus according to claim 2; and
the inverter which drives the synchronous electric motor, based on the gate command.

7. The apparatus according to claim 1, wherein the high-frequency voltage calculator converts the gate command into an output voltage command on an orthogonal coordinate system which rotates in synchronism with rotation of the synchronous motor, and calculates each high-frequency voltage component, based on the output voltage command, and
wherein the high-frequency current calculator converts the current response value of the synchronous motor into a current response value on an orthogonal coordinate system which rotates in synchronism with the rotation of the synchronous motor, and calculates each high-frequency current component, based on the current response value.

8. The apparatus according to claim 7, wherein the estimated angle calculator comprises:
a first calculator which calculates an inductance of the synchronous motor, based on the selected two pairs of the high-frequency voltage component and the high-frequency current component;
a second calculator which calculates an estimated angle-of-rotation error, based on the inductance; and
a PLL circuit configured to set the estimated angle-of-rotation error to zero, wherein the PLL circuit provides the estimated phase angle.

9. The apparatus according to claim 1, wherein the estimated angle calculator comprises:
a first calculator which calculates an inductance of the synchronous motor, based on the selected two pairs of the high-frequency voltage component and the high-frequency current component; and
a second calculator which calculates the estimated phase angle of the synchronous motor, based on the inductance.

10. The apparatus according to claim 1, further comprising a voltage command determination unit which superimposes, on an output-voltage command value, a high-frequency voltage in a direction perpendicular to the output-voltage command value, at a frequency not higher than the PWM carrier frequency, when a direction of the output-voltage command value to the inverter before the pulse-width modulation is in a vicinity of a direction of a non-zero-voltage vector of the inverter.

11. The apparatus according to claim 1, further comprising a voltage command determination unit which superimposes, on an output-voltage command value, a high-frequency voltage in a direction different from a non-zero-voltage vector of the inverter, at a frequency not higher than the PWM carrier frequency, when a size of the output-voltage command value to the inverter before the pulse-width modulation is equal to or smaller than a predetermined value.

12. An inverter apparatus comprising:
the sensorless control apparatus according to claim 1; and
the inverter which drives the synchronous electric motor, based on the gate command.

* * * * *